United States Patent
Miyahara et al.

(10) Patent No.: US 10,791,387 B2
(45) Date of Patent: Sep. 29, 2020

(54) WIRELESS MICROPHONE SYSTEM, RECEIVING APPARATUS AND WIRELESS SYNCHRONIZATION METHOD

(71) Applicant: Panasonic Intellectual Property Management Co., Ltd., Osaka (JP)

(72) Inventors: Takeshi Miyahara, Fukuoka (JP); Katsumi Nakagawa, Fukuoka (JP); Ryosuke Kitago, Fukuoka (JP); Hisayuki Sasaki, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 57 days.

(21) Appl. No.: 16/247,929

(22) Filed: Jan. 15, 2019

(65) Prior Publication Data

US 2019/0268683 A1    Aug. 29, 2019

(30) Foreign Application Priority Data

Feb. 26, 2018 (JP) ................................ 2018-032444

(51) Int. Cl.
*H04W 4/80* (2018.01)
*H04W 56/00* (2009.01)
(Continued)

(52) U.S. Cl.
CPC .............. *H04R 1/04* (2013.01); *H04J 3/0658* (2013.01); *H04R 1/083* (2013.01); *H04R 2420/07* (2013.01)

(58) Field of Classification Search
CPC ............ H04B 5/06; H04B 1/20; H04B 7/269; H04W 4/80; H04W 56/01; H04W 84/20;
(Continued)

(56) References Cited

U.S. PATENT DOCUMENTS 9,401,734 B2 *   7/2016   Sakamoto .......... H04B 7/15507
9,979,998 B1 *   5/2018   Pogue ................ H04N 21/4307
(Continued)

FOREIGN PATENT DOCUMENTS

JP            2015-50727          3/2015

*Primary Examiner* — Andrew Wendell
(74) *Attorney, Agent, or Firm* — Wenderoth, Lind & Ponack, L.L.P.

(57) ABSTRACT

One of the plurality of first slave receiving apparatuses which serves as a reference first slave receiving apparatus repeatedly transmits a wireless control signal for controlling synchronization between a first receiving apparatus segment and a second receiving apparatus segment. One of the plurality of second slave receiving apparatuses which serves as a reference second slave receiving apparatus transmits a reference timing signal for performing synchronization in the second receiving apparatus segment including the reference second slave receiving apparatus to the second master receiving apparatus in synchronization with the wireless control signal. The second master receiving apparatus transmits a synchronization timing signal for performing synchronization in the second receiving apparatus segment including the second master receiving apparatus to another one of the plurality of second slave receiving apparatuses in the second receiving apparatus segment including the second master receiving apparatus, in response to the reference timing signal.

7 Claims, 22 Drawing Sheets

(51) Int. Cl.
*H04R 1/04* (2006.01)
*H04R 1/08* (2006.01)
*H04J 3/06* (2006.01)

(58) Field of Classification Search
CPC ...... H04R 1/04; H04R 1/083; H04R 2420/07; H04R 3/005; H04J 3/0658; H04J 3/0605
See application file for complete search history.

(56) References Cited

U.S. PATENT DOCUMENTS

| | | | |
|---|---|---|---|
| 2007/0279248 A1* | 12/2007 | Matsumoto | G08C 17/02 340/13.24 |
| 2009/0303969 A1* | 12/2009 | Lee | H04B 7/208 370/336 |
| 2011/0059696 A1* | 3/2011 | Rasmussen | H04R 25/554 455/41.1 |
| 2011/0148850 A1* | 6/2011 | Kadota | G09G 3/3685 345/213 |
| 2013/0342663 A1* | 12/2013 | Hara | G09G 3/003 348/54 |
| 2015/0063604 A1 | 3/2015 | Ohbuchi et al. | |
| 2016/0094270 A1* | 3/2016 | Seller | H04J 3/0608 375/139 |
| 2018/0249448 A1* | 8/2018 | Yasukawa | H04W 28/06 |

\* cited by examiner

WIRELESS MICROPHONE SYSTEM, RECEIVING APPARATUS AND WIRELESS SYNCHRONIZATION METHOD

BACKGROUND OF THE INVENTION

1. Field of the Invention

The present disclosure is related to a wireless microphone system, a receiving apparatus, and a wireless synchronization method which receive an audio signal transmitted between a plurality of microphones by using time division multiplex communication.

2. Background Art

In the related art, there is known a wireless microphone system which transmits an audio signal collected by a microphone, by using wireless communication. The wireless microphone system includes a plurality of microphone slave devices and a receiving apparatus (master device) which receives the audio signal transmitted from the microphone slave device through a communication channel established with each of the microphone slave devices. The master device includes a speaker and causes the speaker to output the audio signal collected by each of the microphone slave devices. Since the wireless microphone system can flexibly correspond to a use environment, the wireless microphone system can be used in various ways in, for example, a school classroom, a hotel banquet hall, or the like.

In addition, another wireless microphone system includes a plurality of microphone slave devices, a plurality of master devices, and a mixing and receiving apparatus positioned as a further higher master device of each of the master devices. Each of the master devices performs wireless communication with the plurality of microphone slave devices by a time division multiplex communication method. The mixing and receiving apparatus includes a speaker and combines audio signals input from the plurality of master devices to output the resultant audio signal.

JP-A-2015-50727 discloses a wireless communication system which includes one master device and a plurality of microphone slave devices and the master device performs wireless communication with each of the microphone slave devices by using a time division multiplex communication method. In this wireless communication system, in order to suppress radio wave interference to other wireless communication systems, the master device suppresses transmission power to the distant microphone slave device to the extent that communication can be maintained.

SUMMARY OF THE INVENTION

In one wireless microphone system, in a case where a plurality of master devices perform wireless communication with a plurality of microphone slave devices according to respectively independent clocks, there is a high probability that the plurality of master devices do not operate according to the same clock and a clock deviation may occur. In this case, there is a problem that a collision of audio signals input from the master unit to a mixing and receiving apparatus may occur and audio noise may occur.

Furthermore, in a case where there is an environment in which some areas coexist in respective coverage areas of the plurality of wireless microphone systems, even if the clocks from the plurality of master devices are synchronized in each of the wireless systems, a clock deviation may occur between the master devices as references in the respective wireless microphone systems among the other wireless microphone systems. For this reason, in a case where the clock deviation occurs between the master devices as references in the different wireless microphone systems, there is a high probability that wireless signals transmitted from the respective wireless systems collide with each other during a long time. As a result, there is a high possibility that interference in the audio signal occurs and audio noise occurs. For example, in a case of performing a handover in which the microphone slave device transitions from the wireless microphone system, to which the microphone slave device currently belongs, to another wireless microphone system, if a clock deviation occurs between the wireless microphone systems, audio communication from the microphone slave device to the master device cannot be smoothly performed.

JP-A-2015-50727 described above discloses a technology of suppressing the interference to the other wireless communication system by reducing transmission power in a case where one master device performs wireless communication with the plurality of microphone slave devices, but the technology does not consider for the clock deviation between the master devices in one wireless microphone system or the different wireless microphone systems described above.

In view of the related art described above, an object of the present disclosure is to provide a receiving apparatus, and a wireless synchronization method capable of precisely realizing wireless synchronization between the respective wireless microphone systems and supporting an output of a high-quality audio signal between the respective wireless microphone systems even in an environment where a coexistent area exists in the coverage areas of the plurality of wireless microphone systems.

The present disclosure provides a wireless microphone system including a first receiving apparatus segment that includes a plurality of first slave receiving apparatuses capable of respectively performing wireless communication with one or more microphones and a first master receiving apparatus connected with the plurality of first slave receiving apparatuses, and at least one second receiving apparatus segment that includes a plurality of second slave receiving apparatuses capable of respectively performing wireless communication with one or more microphones and a second master receiving apparatus connected with the plurality of second slave receiving apparatuses. One of the plurality of first slave receiving apparatuses which serves as a reference first slave receiving apparatus repeatedly transmits a wireless control signal for controlling synchronization between the first receiving apparatus segment and the second receiving apparatus segment. One of plurality of second slave receiving apparatuses which serves as a reference second slave receiving apparatus transmits a reference timing signal for performing synchronization in the second receiving apparatus segment including the reference second slave receiving apparatus to the second master receiving apparatus in synchronization with the wireless control signal. The second master receiving apparatus transmits a synchronization timing signal for performing synchronization in the second receiving apparatus segment including the second master receiving apparatus to another one of the plurality of the second slave receiving apparatuses in the second receiving apparatus segment including the second master receiving apparatus, in response to the reference timing signal.

In addition, the present disclosure provides a wireless synchronization method implemented by a wireless microphone system including a first receiving apparatus segment that includes a plurality of first slave receiving apparatuses capable of respectively performing wireless communication with one or more microphones and a first master receiving apparatus connected with the plurality of first slave receiving apparatuses and at least one second receiving apparatus segment that includes a plurality of second slave receiving apparatuses capable of respectively performing wireless communication with one or more microphones and a second master receiving apparatus connected with the plurality of second slave receiving apparatuses. The method includes repeatedly transmitting a wireless control signal for controlling synchronization between the first receiving apparatus segment and the second receiving apparatus segment, transmitting a reference timing signal for performing synchronization in the second receiving apparatus segment including the reference second slave receiving apparatus to the second master receiving apparatus in synchronization with the wireless control signal, and transmitting a synchronization timing signal for performing synchronization in the second receiving apparatus segment including the second master receiving apparatus to another one of the plurality of second slave receiving apparatuses in the second receiving apparatus segment including the second master receiving apparatus, in response to the reference timing signal.

In addition, the present disclosure provides a receiving apparatus capable of performing wireless communication with one or more microphones, the receiving apparatus including: a wireless communication unit that performs wireless communication with one or more microphones and performs wireless communication with another receiving apparatus disposed in at least one other segment different from an own segment in which the receiving apparatus is disposed, and a controller that generates a wireless control signal for controlling synchronization between the own segment and the other segment, in which the wireless communication unit repeatedly transmits the generated wireless control signal to the other receiving apparatus.

According to the present disclosure, even in an environment where the coexistent area exists in the coverage areas of the plurality of wireless microphone systems, wireless synchronization between the respective wireless microphone systems can be precisely realized and an output of a high-quality audio signal between the respective wireless microphone systems can be supported.

DETAILED DESCRIPTION OF THE EXEMPLARY EMBODIMENT

Details to Contents of Embodiment 1

Figure 1:
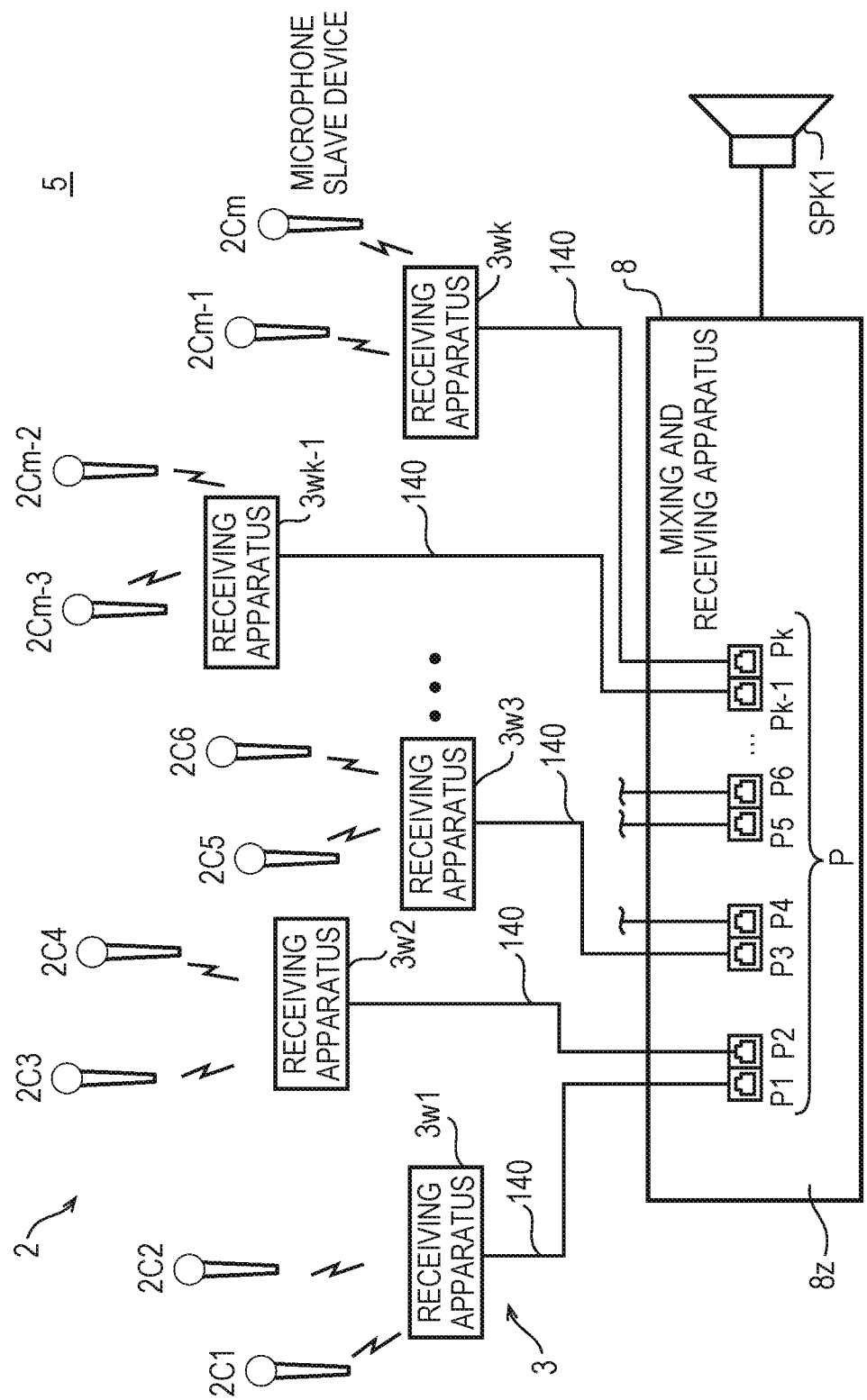
FIG. 1 is a diagram schematically illustrating a system configuration example of a wireless microphone system according to Embodiment 1.

In one wireless microphone system, in a case where a plurality of master devices perform wireless communication with a plurality of microphone slave devices according to respectively independent clocks, there is a high probability that the plurality of master devices do not operate according to the same clock and a clock deviation may occur. In this case, there is a problem that a collision of audio signals input from the master unit to a mixing and receiving apparatus may occur and audio noise may occur.

Furthermore, in a case where there is an environment in which some areas coexist in respective coverage areas of the plurality of wireless microphone systems, even if the clocks from the plurality of master devices are synchronized in each of the wireless systems, a clock deviation may occur between the master devices as references in the respective wireless microphone systems among the other wireless microphone systems. For this reason, in a case where the clock deviation occurs between the master devices as references in the different wireless microphone systems, there is a high probability that wireless signals transmitted from the respective wireless systems collide with each other during a long time. As a result, there is a high possibility that interference in the audio signal occurs and audio noise occurs. For example, in a case of performing a handover in which the microphone slave device transitions from the wireless microphone system, to which the microphone slave device currently belongs, to another wireless microphone system, if a clock deviation occurs between the wireless microphone systems, audio communication from the microphone slave device to the master device cannot be smoothly performed.

JP-A-2015-50727 described above discloses a technology of suppressing the interference to the other wireless communication system by reducing transmission power in a case where one master device performs wireless communication with the plurality of microphone slave devices, but the technology does not consider for the clock deviation between the master devices in one wireless microphone system or the different wireless microphone systems described above.

Therefore, in Embodiment 1 described below, examples of a receiving apparatus, and a wireless synchronization method capable of precisely realizing wireless synchronization between the respective wireless microphone systems and supporting an output of a high-quality audio signal between the respective wireless microphone systems even in an environment where a coexistent area exists in the coverage areas of the plurality of wireless microphone systems will be described.

Hereinafter, embodiments which specifically disclose a wireless microphone system, a receiving apparatus, a wireless synchronization method, and a power supply method according to the present disclosure will be described in detail with reference to the appropriate drawings. However, in some cases, an unnecessarily detailed explanation may be omitted. For example, in some cases, a detailed explanation of already well-known items and a repetition explanation of substantially the same configuration may be omitted. This is for avoiding unnecessary repetition of the following description and for facilitating understanding by those skilled in the art. The accompanying drawings and the following description are provided to enable those skilled in the art to fully understand the present disclosure and are not intended to limit a scope of the claims.

Embodiment 1

In the wireless microphone system according to Embodiment 1, a plurality of receiving apparatuses are arranged at regular intervals in a room such as a hall. Each of the receiving apparatuses functions as a master device of a communication target for one or more microphone slave devices (that is, wireless microphones). Each of the microphone slave devices can be recognized by a person (for example, a user of the microphone slave device). During communication with the master device, while the handover is performed as the person moves, the microphone slave device can move between the master devices in the same wireless microphone system. In addition, the microphone slave device also can move while performing the handover from the wireless microphone system, to which the microphone slave device currently belongs, including the plurality of master devices to another wireless microphone system.

FIG. 1 is a diagram schematically illustrating a system configuration example of a wireless microphone system 5 according to Embodiment 1. The wireless microphone system 5 is configured to include a plurality (for example, m) of microphone slave devices 2 (examples of microphones), a plurality of receiving apparatuses 3 (master devices), and one mixing and receiving apparatus 8. Here, m is an integer equal to or larger than 2. In the following description, in a case where a plurality of microphone slave devices 2C1, 2C2, . . . , and 2Cm are not particularly distinguished from one another, each of the plurality of microphone slave devices 2C1, 2C2, . . . , and 2Cm is referred to as the microphone slave device 2. In FIG. 1, for example, the microphone slave device 2C1 and the microphone slave device 2C2 belong to a receiving apparatus $3w1$ (that is, the receiving apparatus $3w1$ is recognized as a target (master device) of wireless communication). The microphone slave device 2C3 and the microphone slave device 2C4 belong to a receiving apparatus $3w2$ (that is, the receiving apparatus $3w2$ is recognized as a target (master device) of wireless communication). The microphone slave device 2Cm-1 and the microphone slave device 2Cm belong to a receiving apparatus $3wk$ (that is, the receiving apparatus $3wk$ is recognized as a target (master device) of wireless communication). The number of microphone slave devices belong to one receiving apparatus may be predetermined. Further, each of the microphone slave devices 2 may duplicately belong to a plurality of receiving apparatuses $3w1$, $3w2$, $3w3$, . . . , $3wk-1$, and $3wk$. For example, all of the microphone slave devices 2 may belong to all of the receiving apparatuses $3w1$ to $3wk$.

A wireless signal (for example, an audio signal or a control signal) is transmitted and received between the microphone slave device 2 and the receiving apparatus 3, to which the microphone slave device 2 belongs, through a wireless line according to a communication standard (for example, a time division multiplex communication method) of a time division multiple access method. If the user of the microphone slave device 2 inputs a sound to the microphone slave device 2 (for example, make a sound), a collected audio signal is transmitted to the receiving apparatus 3 by the microphone slave device 2 through a wireless line. Each of the embodiments will be described by using a digital enhanced cordless telecommunications (DECT) method with a frequency bandwidth of 1.9 GHz, for example, which is a standard of a digital cordless telephone established in 2011, as a communication standard of the time division multiplex communication method.

The plurality of receiving apparatuses 3 outputs the audio signals received from the microphone slave devices 2 belong to the respective receiving apparatuses 3, to the mixing and receiving apparatus 8. A plurality of ports P (P1, P2, . . . , and Pm), to which signal lines 140 respectively connected to the plurality of receiving apparatuses 3 can connect, are arranged in a housing $8z$ of the mixing and receiving apparatus 8. The mixing and receiving apparatus 8 combines one or more audio signals input from the plurality of receiving apparatuses 3 respectively connected to the plurality of ports P and causes an external speaker SPK1 to output a sound which is the combined audio signal. Each of the receiving apparatuses 3 may transmit the audio signal to the mixing and receiving apparatus 8 and cause an external speaker SPK2 (see FIG. 6) connected to the receiving apparatus 3 to reproduce the sound.

Figure 2:
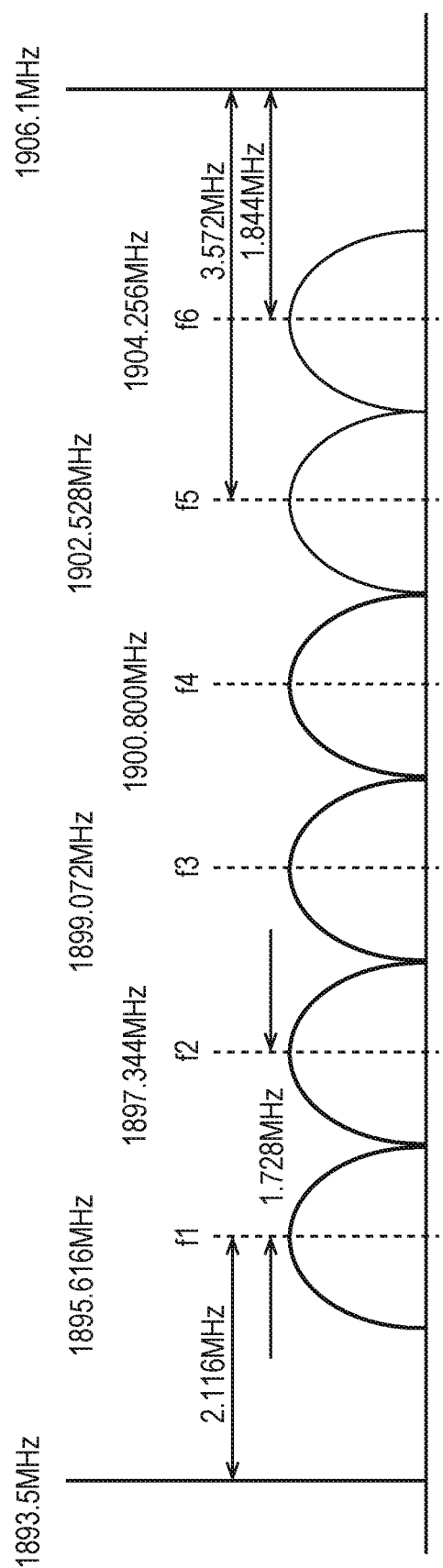
FIG. 2 is a diagram for explaining a frequency bandwidth of a carrier used in communication of a DECT method.

FIG. 2 is a diagram for explaining a frequency bandwidth of a carrier used in communication of a DECT method. In communication of the DECT method, six frequency bandwidths are used in a 1.9 GHz bandwidth (specifically, 1895,616 MHz to 1902.528 MHz). Specifically, the six frequency bandwidths include a carrier having a center frequency of f1 (1895.616 MHz) (that is, a carrier wave or the like and the same as below) and a carrier having a center frequency of f2 (1897.344 MHz), a carrier having a center frequency of f3 (1899.072 MHz), a carrier having a center frequency of f4 (1900.800 MHz), a carrier having a center frequency of f5 (1902.528 MHz), and a carrier having a center frequency f6 (1904.256 MHz).

Since these frequency bandwidths do not overlap with each other, radio frequency interference hardly occurs and communication problem can be reduced. In addition, since the DECT communication using the 1.9 GHz bandwidth does not interfere with radio waves emitted from devices such as a wireless local area network (LAN) and a microwave oven, sound quality of the wireless microphone system can be maintained. Further, the receiving apparatus 3 monitors a use status of a channel in each of frequency bandwidths (for example, resource availability such as carriers and slots) all the time, every frame period of the DECT communication and the channel of the optimum frequency bandwidth is selected so that the 1.9 GHz bandwidth can be efficiently used.

Figure 3:
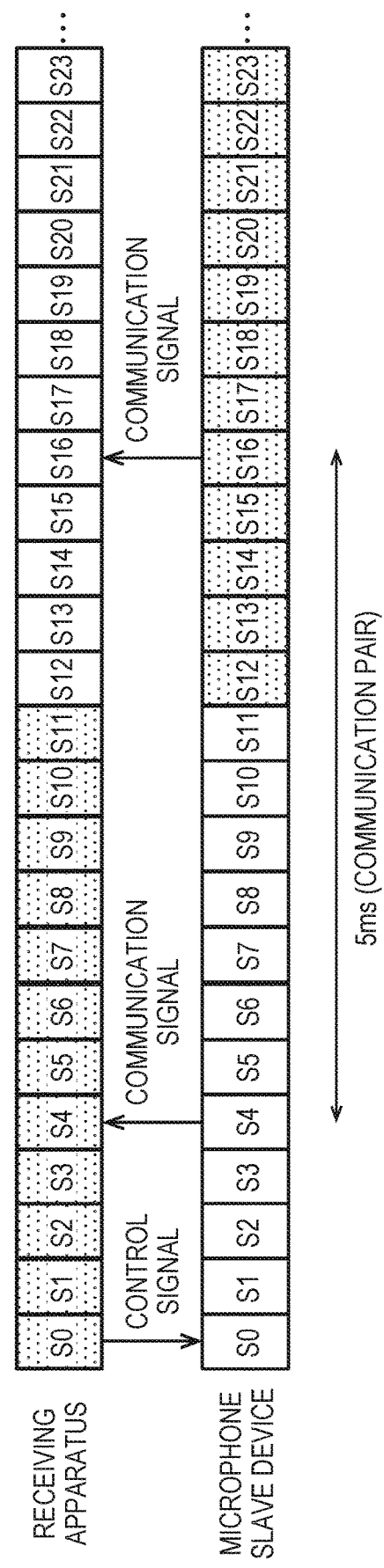
FIG. 3 is a diagram illustrating a time slot when a wireless signal is transmitted and received between a receiving apparatus and a microphone slave device.
Figure 4:
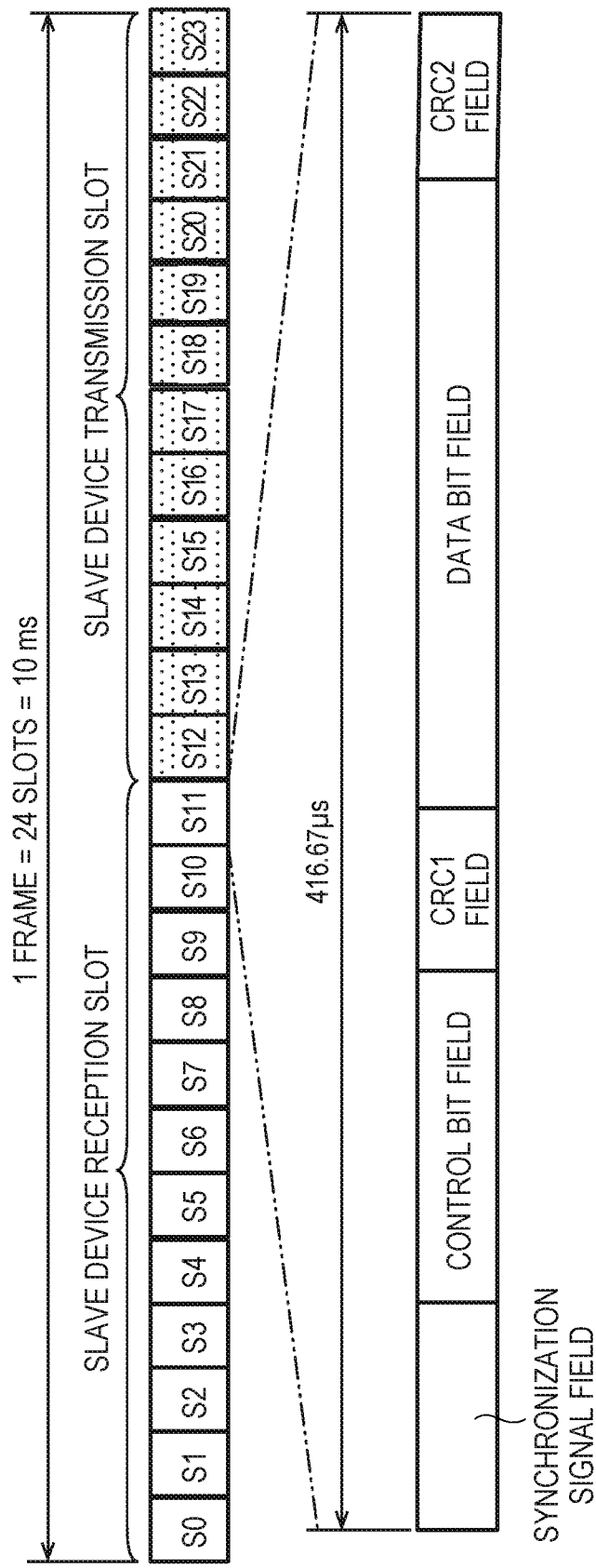
FIG. 4 is a diagram illustrating a frame configuration of a signal in the DECT communication.

FIG. 3 is a diagram illustrating a time slot when a wireless signal is transmitted and received between the receiving apparatus 3 and the microphone slave device 2. Hereinafter, the time slot is simply referred to as "slot". FIG. 4 is a diagram illustrating a frame configuration of a signal in the DECT communication. The wireless signal is transmitted and received between the receiving apparatus 3 and each of the microphone slave devices 2 every frame period by using a default number (for example, n) of slots defined according to a communication standard. In a case where the communication standard is a DECT method, one frame period corresponds to 10 ms and is configured to include, for example, n=24 slots (that is, 12 slots for downlink and 12 slots for uplink).

In wireless communication (hereinafter, referred to as "DECT communication") using the DECT method, generally, slots S0 to S11 for downlink are used for communication from the receiving apparatus 3 to the microphone slave device 2. Slots S12 to S23 for uplink are used for communication from the microphone slave device 2 to the receiving apparatus 3. In the communication between the receiving apparatus 3 and the microphone slave device 2, the slots having a positional relationship in which the slots are separated by 5 ms corresponding to ½ cycles are used in combination (a pair of slots) such as the slots S0 and S12, the slots S1 and S13, and the like. The pair of slots constitutes one channel (for example, control channel for transmitting and receiving control information and communication channel for transmitting and receiving an audio signal).

In addition, among the 12 slots through which the transmission is performed from the receiving apparatus 3 to the microphone slave device 2, at least one slot (for example, slot S0) is set to a control slot for transmitting the control signal including the control information from the receiving apparatus 3 to the microphone slave device 2. The control signal is transmitted from the receiving apparatus 3 to each of the microphone slave devices 2 by using one slot among the slots of a default number constituting one frame period. In a case where radio frequency interference occurs while the control signal is transmitted from the receiving apparatus 3 to the microphone slave device 2, the empty slot (in other words, unused slot) may be used as the control slot. For example, in a case where radio frequency interference or the like occurs in the slot S0, the receiving apparatus 3 also may change the control slot from the slot S0 to another empty slot (for example, slot for switching described below). In conjunction with this, a response slot to the control slot (that is, the slot used for a response to the control slot and used for transmission from the microphone slave device 2 to the receiving apparatus 3) is changed from the slot S12 to another empty slot (for example, the same type of slot for switching described below). In this way, the receiving apparatus 3 dynamically determines the slot used as the control channel or the communication channel every frame period of the DECT communication according to a radio status or the like between the receiving apparatus 3 and each of the microphone slave devices 2. For example, in a device such as a cordless phone or the like, the receiving apparatus is a transmission side and the slave device is a reception side in the first half slots S0 to S11 and the receiving apparatus is the reception side and the slave device is the transmission side in the latter half slots S12 to S23.

On the other hand, in the wireless microphone system 5, the receiving apparatus 3 receives the audio signal transmitted from each of the plurality of microphone slave devices 2. In addition, the receiving apparatus 3 may transmit the control signal to each of the microphone slave devices 2 once during one frame period. Therefore, in Embodiment 1, the receiving apparatus 3 dynamically determines the slots S0 to S11 so as to use the first half slots S0 to S11 as the slot for uplink (communication slot) in which the microphone slave device 2 is the transmission side.

For example, the receiving apparatus 3 determines the slot S0 within one frame period as the control channel for transmitting the control signal and transmits the control signal to the microphone slave device 2 through the control channel. The control information included in the control signal includes, for example, system information, slot information, and carrier information. Specifically, the control information includes, for example, identification information of the microphone slave device 2 which is a communication target using a carrier and a slot, identification information of the carrier or the slot, information such as slot switching or the like by a busy state of each of the slots, designation of an available empty slot, the number of connected microphone slave devices, a radio error status of the receiving apparatus, radio interference.

Each of the slots constituting one frame of the DECT communication is defined by a time width of 416.67 µs (=10 ms/24), specifically, is configured to include a synchronization signal field, a control bit field, a CRC1 field, a data bit field, and a CRC2 field. The synchronization signal field includes fixed data configured to include a data string for synchronizing bits and a data string for synchronizing slots. The control bit field includes the control signal described above. In a case where the amount of control information included in the control signal increases, for example, not only the control bit field but also a part of an area of the data bit field may be used. The CRC1 field includes a cyclic redundancy check (CRC) code calculated based on the data string of the control bit field and is used for detecting a transmission error of the control bit field. The data bit field is used for audio communication. The CRC2 field includes a CRC code calculated based on the data string of the data bit field and is used for detecting a transmission error of the data bit field.

Figure 5:
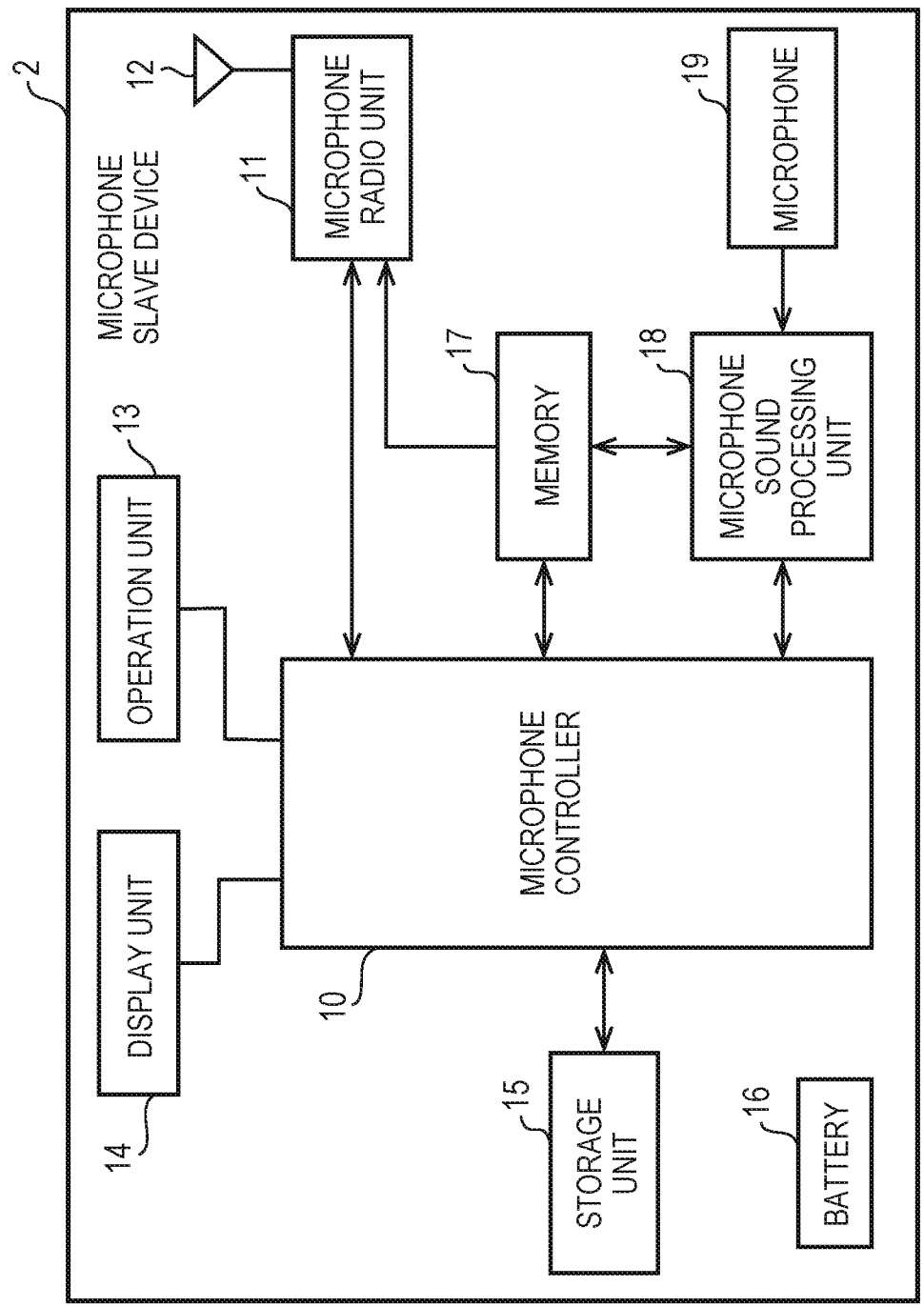
FIG. 5 is a block diagram illustrating a hardware configuration example of the microphone slave device.

FIG. 5 is a block diagram illustrating a hardware configuration example of the microphone slave device 2. The microphone slave device 2 as a microphone is configured to include a microphone controller 10, a microphone radio unit 11, and an antenna 12 connected to the microphone radio unit 11. In addition, the microphone slave device 2 includes an operation unit 13 which includes a sound quality setting button as a user interface or a switch for turning on/off a power supply, a display unit 14 which displays setting contents and the like by the operation unit 13, and a storage unit 15 configured with a non-volatile memory. Further, the microphone slave device 2 is configured to include a battery 16 for supplying power to each of the units of the microphone slave device 2, a memory 17, configured with a dual port random access memory (RAM), functioning as a ring buffer, a microphone sound processing unit 18, and a microphone 19 for inputting a sound.

The microphone controller 10 includes a central processing unit (CPU) combined with the storage unit 15 via a bus or the like. The microphone controller 10 controls an operation of each of the units of the microphone slave device 2 and detects that the sound quality setting button is pressed, for example. In addition, the microphone controller 10 sets an operation timing for the microphone radio unit 11 or the microphone sound processing unit 18.

Figure 6:
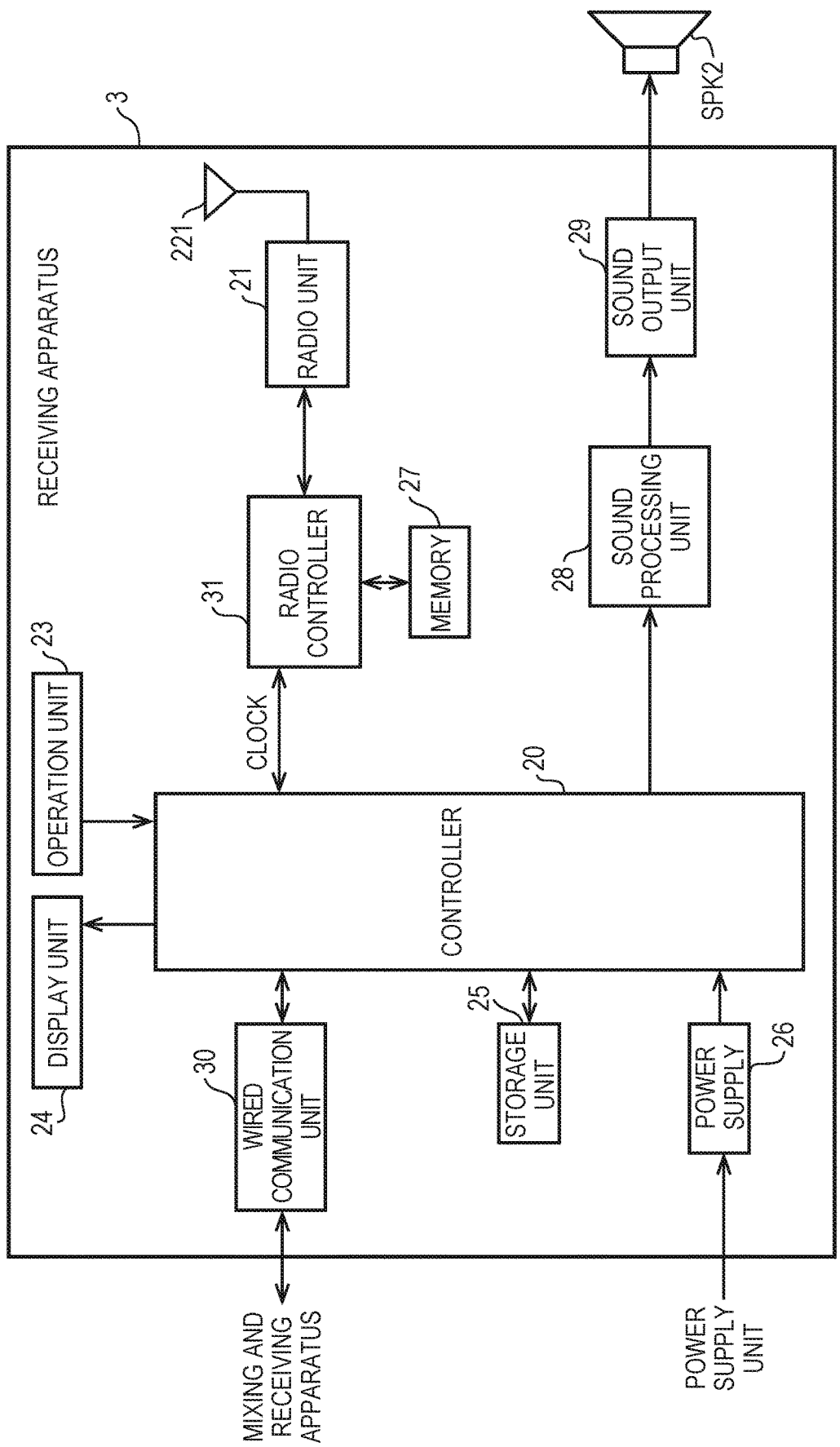
FIG. 6 is a block diagram illustrating a hardware configuration example of the receiving apparatus.

FIG. 6 is a block diagram illustrating a hardware configuration example of the receiving apparatus 3. The receiving apparatus 3 is a receiving apparatus which performs wireless communication with the microphone slave device 2. The receiving apparatus 3 includes a controller 20 as an example of a controller which controls each of the units, a radio controller 31, a radio unit 21, an antenna 221, and a memory 27. In addition, the receiving apparatus 3 is configured to include an operation unit 23, a display unit 24, and a storage unit 25. The operation unit 23 includes a volume as a user interface and a power supply switch. The display unit 24 displays setting contents and the like by the operation unit 23. The storage unit 25 is configured with a non-volatile memory. In addition, the receiving apparatus 3 is configured to include a power supply 26, a sound processing unit 28, a sound output unit 29, and a wired communication unit 30.

The power supply 26 supplies power to each of the units of the receiving apparatus 3. The power supply 26 receives a voltage supplied from the mixing and receiving apparatus 8 through the signal line 140. Further, the power supply 26 can receive the voltage supplied from the power supply unit. The sound output unit 29 reproduces the sound by connecting to the external speaker SPK2. The wired communication unit 30 is connected to the mixing and receiving apparatus 8 via the signal line 140 and transmits the audio signal, on which an audio process is performed by the receiving apparatus 3, from the microphone slave device 2 to the mixing and receiving apparatus 8.

The controller 20 is combined with the storage unit 25 via a bus or the like. The controller 20 controls an operation of each of the units of the receiving apparatus 3 and obtains operation contents input via the operation unit 23. In addition, the controller 20 detects whether or not the mixing and receiving apparatus 8 is powered off based on magnitude of the voltage supplied through the signal line 140.

Further, the controller 20 detects a transmission error of a compressed signal transmitted from the microphone slave device 2. Specifically, when the radio unit 21 receives the compressed signal transmitted from the microphone slave device 2, the controller 20 refers to the CRC2 field which is an error detection field to detect existence of a transmission error. The controller 20 supplies a clock of the wireless communication to the radio controller 31. The radio controller 31 controls a wireless connection with the microphone slave device 2 and performs an instruction of the carrier and the slot designated by the controller 20 to the radio unit 21. That is, the radio controller 31 controls the radio unit 21 so as to communicate with the microphone slave device 2 associated with the designated carrier and slot. The radio unit 21 (an example of a wireless communication unit) performs communication with the microphone slave device 2 by the designated carrier and slot via the wireless antenna 221. In addition, the radio unit 21 generates a wireless control signal for controlling synchronization of the wireless microphone system and can periodically transmit the radio control signal. Further, the radio controller 31 stores the audio signal from the microphone slave device 2 in the memory 27. The memory 27 is configured with a dual port random access memory (RAM) and functions as a ring buffer.

A timer is embedded in the controller 20. For example, the timer measures a time until the wireless control signal is received from a main reference receiving apparatus and is synchronized. In a case where the wireless control signal is not received from the main reference receiving apparatus even if the time measured by the timer elapses a predetermined time, the controller 20 determines a failure of a searching operation or abnormality as the reference receiving apparatus does not exist.

Figure 7:
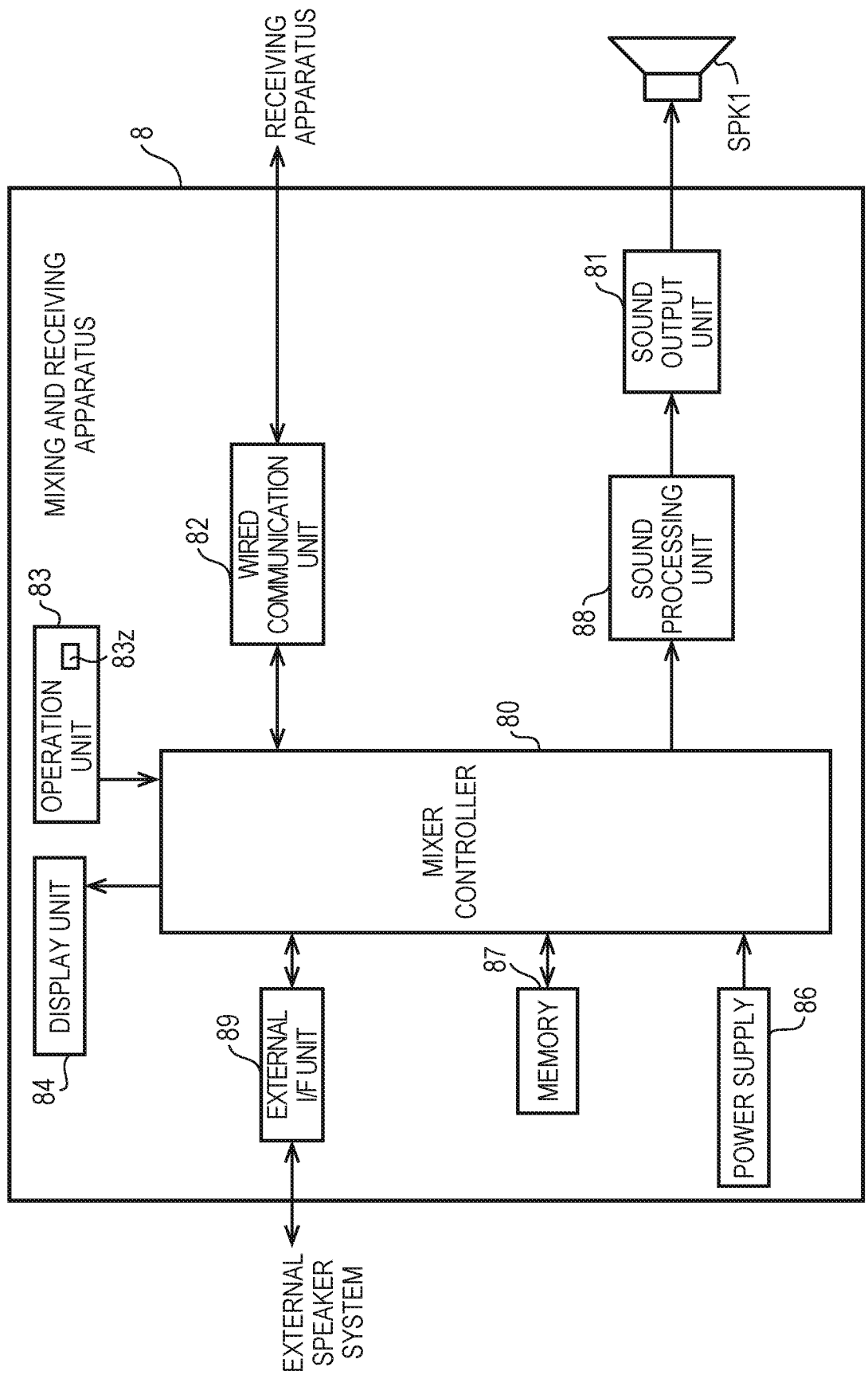
FIG. 7 is a block diagram illustrating a hardware configuration example of a mixing and receiving apparatus.

FIG. 7 is a block diagram illustrating a hardware configuration example of the mixing and receiving apparatus 8. The mixing and receiving apparatus 8 is configured to include a mixer controller 80, a wired communication unit 82, a memory 87, a sound processing unit 88, and a sound output unit 81.

The mixer controller 80 controls an operation of each of the units of the mixing and receiving apparatus 8 and obtains operation contents input via an operation unit 83. In addition, the mixer controller 80 sets an operation timing of the sound processing unit 88. Further, when receiving a reference timing signal from the reference receiving apparatus (for example, the receiving apparatus $3w1$), the mixer controller 80 transmits a synchronization signal to the other receiving apparatuses (for example, the receiving apparatuses $3w2$, $3w3$, and $3wk$).

The wired communication unit 82 can communicate with the plurality of receiving apparatuses $3w1$, $3w2$, $3w3$, ..., and $3wk$ connected via the signal line 140. The signal line 140 has a power supply line capable of supplying power. For the signal line 140, for example, a power over ethernet (PoE) cable is used. The memory 87 temporarily stores the audio data received from the plurality of receiving apparatuses $3w1$, $3w2$, $3w3$, ..., and $3wk$ and stores various setting values. The sound processing unit 88 performs a combination process on the audio signal input from the plurality of receiving apparatuses $3w1$ to $3wk$ connected via the wired communication unit 82 and transmits the resultant signal to the sound output unit 81. The sound output unit 81 outputs the sound by connecting to the external speaker SPK1.

In addition, the mixing and receiving apparatus 8 is configured to include the operation unit 83, a display unit 84, a power supply 86, and an external I/F unit 89. The operation unit 83 includes a volume as a user interface and a power supply switch. Further, the operation unit 83 has a DIP switch $83z$. According to a value of the DIP switch $83z$, the port P to which a main reference receiving apparatus $3Aw1$ is connected is designated. For example, in a case where the DIP switch $83z$ has 3 bits, ports corresponding to values 0 to 7 are set to the port P to which the main reference receiving apparatus $3Aw1$ is connected.

The display unit 84 displays setting contents and the like by the operation unit 83. The power supply 86 is connected to a commercial power supply and supplies a predetermined voltage the mixing and receiving apparatus 8 and the receiving apparatus 3. The external I/F unit 89 changes a setting of the mixing and receiving apparatus 8 and the like with an external device (for example, a PC) connected using a local area network (LAN) or a universal serial bus (USB).

Next, an operation of the wireless microphone system 5 according to Embodiment 1 described above will be described.

Here, a case where the coverage areas of the plurality of wireless microphone systems partially overlap with each other is illustrated. The coverage area means an area (communication range) in which the wireless microphone system can communicate with the plurality of microphone slave devices belonging to the wireless microphone system. In addition, each of the wireless microphone systems is wirelessly synchronized with the plurality of receiving apparatuses in the wireless microphone system and is also wirelessly synchronized with the plurality of receiving apparatuses in the other the wireless microphone system. Here, "synchronization" includes synchronization deviated by a predetermined time in clock units in each of the systems in addition to clock synchronization at the same time (that is, the same timing) in all of the systems. Furthermore, the synchronization also includes synchronization with a time difference to the extent that interference does not occur even if a clock deviation slightly occurs.

Figure 8:
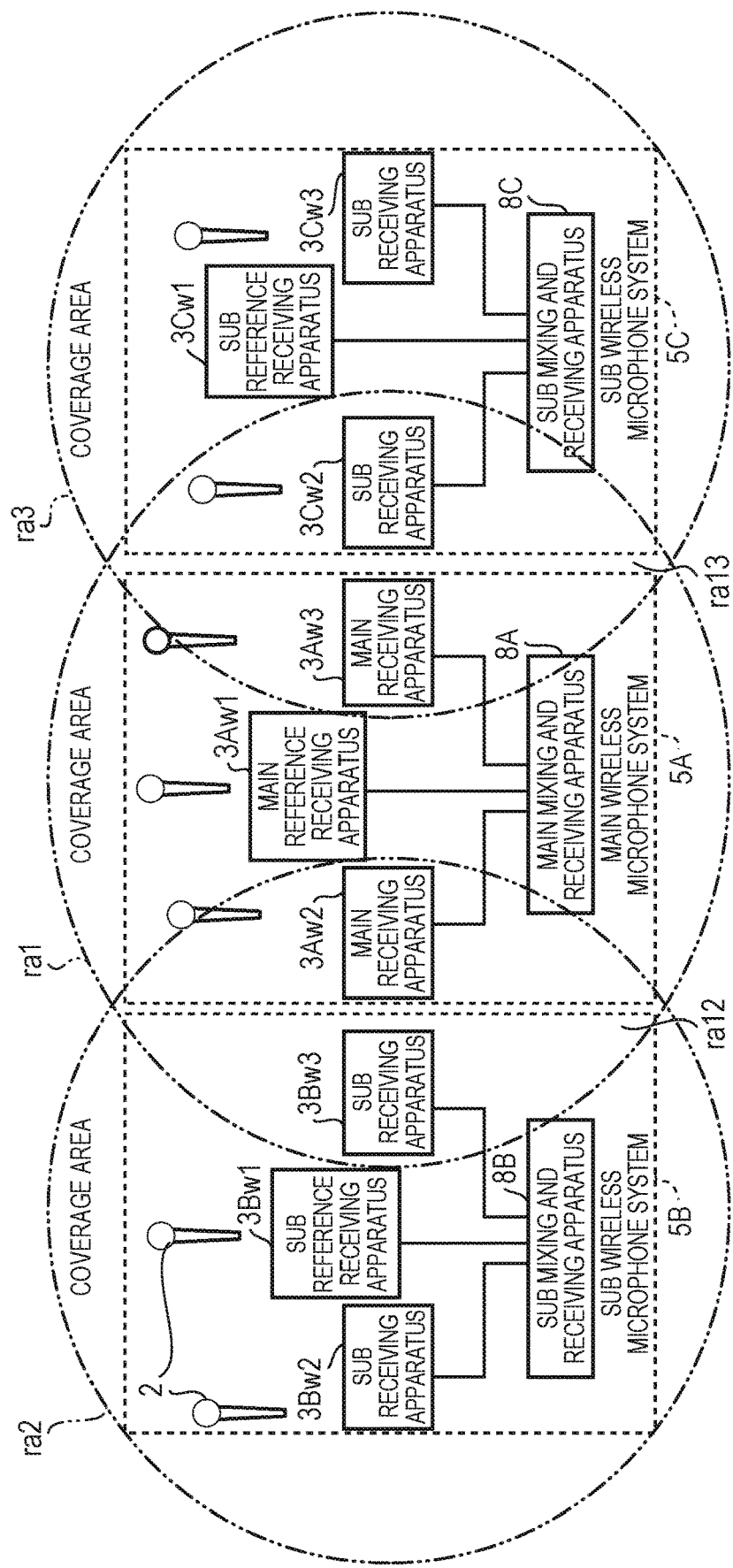
FIG. 8 is a diagram illustrating an example of coverage areas of a plurality of wireless microphones system.

FIG. 8 is a diagram illustrating an example of coverage areas of a plurality of wireless microphones systems 5. Here, as an example of the plurality of wireless microphones systems 5, three wireless microphone systems are illustrated. The three wireless microphone systems are a main wireless microphone system 5A, a sub wireless microphone system 5B, and a sub wireless microphone system 5C.

A coverage area ra1 of the main wireless microphone system 5A and a coverage area ra2 of the sub wireless microphone system 5B are overlapped with each other in a coexistent area ra12 included in a part of the coverage areas ra1 and ra2. In addition, a coverage area ra1 of the main wireless microphone system 5A and a coverage area ra3 of the sub wireless microphone system 5C are overlapped with each other in a coexistent area ra13 included in a part of the coverage areas ra1 and ra3.

Here, both of the main wireless microphone system 5A, and the sub wireless microphone systems 5B and 5C include one reference receiving apparatus and other receiving apparatuses. The reference receiving apparatus included in the main wireless microphone system 5A is referred to as the main reference receiving apparatus 3Aw1. The other reference receiving apparatuses included in the main wireless microphone system 5A are referred to as main receiving apparatuses 3Aw2 and 3Aw3. In the same manner, the reference receiving apparatuses respectively included in the sub wireless microphone systems 5B and 5C are referred to as sub reference receiving apparatuses 3Bw1 and 3Cw1. The other reference receiving apparatuses included in the sub wireless microphone systems 5B and 5C are referred to as sub receiving apparatuses 3Bw2, 3Bw3, 3Cw2, and 3Cw3.

Figure 9:
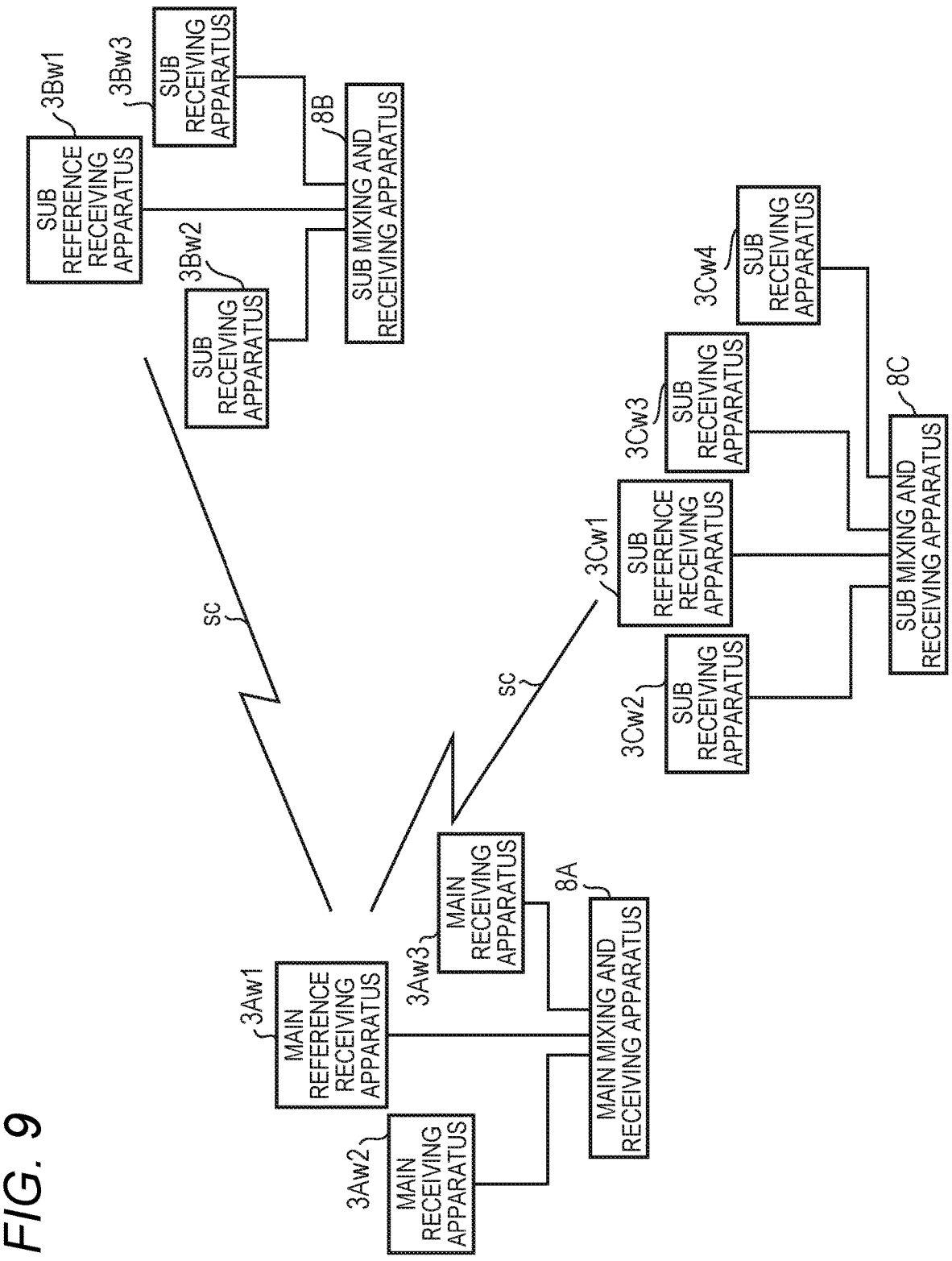
FIG. 9 is a diagram illustrating a form in which a main reference receiving apparatus of a main wireless microphone system transmits a wireless control signal to a sub wireless microphone system.

FIG. 9 is a diagram illustrating a form in which the main reference receiving apparatus 3Aw1 of the main wireless microphone system 5A transmits a wireless control signal to the sub wireless microphone systems 5B and 5C. The main reference receiving apparatus 3Aw1 of the main wireless microphone system 5A generates a wireless control signal sc used for the main wireless microphone system 5A, and periodically and repeatedly transmits the wireless control signal sc to the sub reference receiving apparatuses 3Bw1 and 3Cw1.

Figure 10:
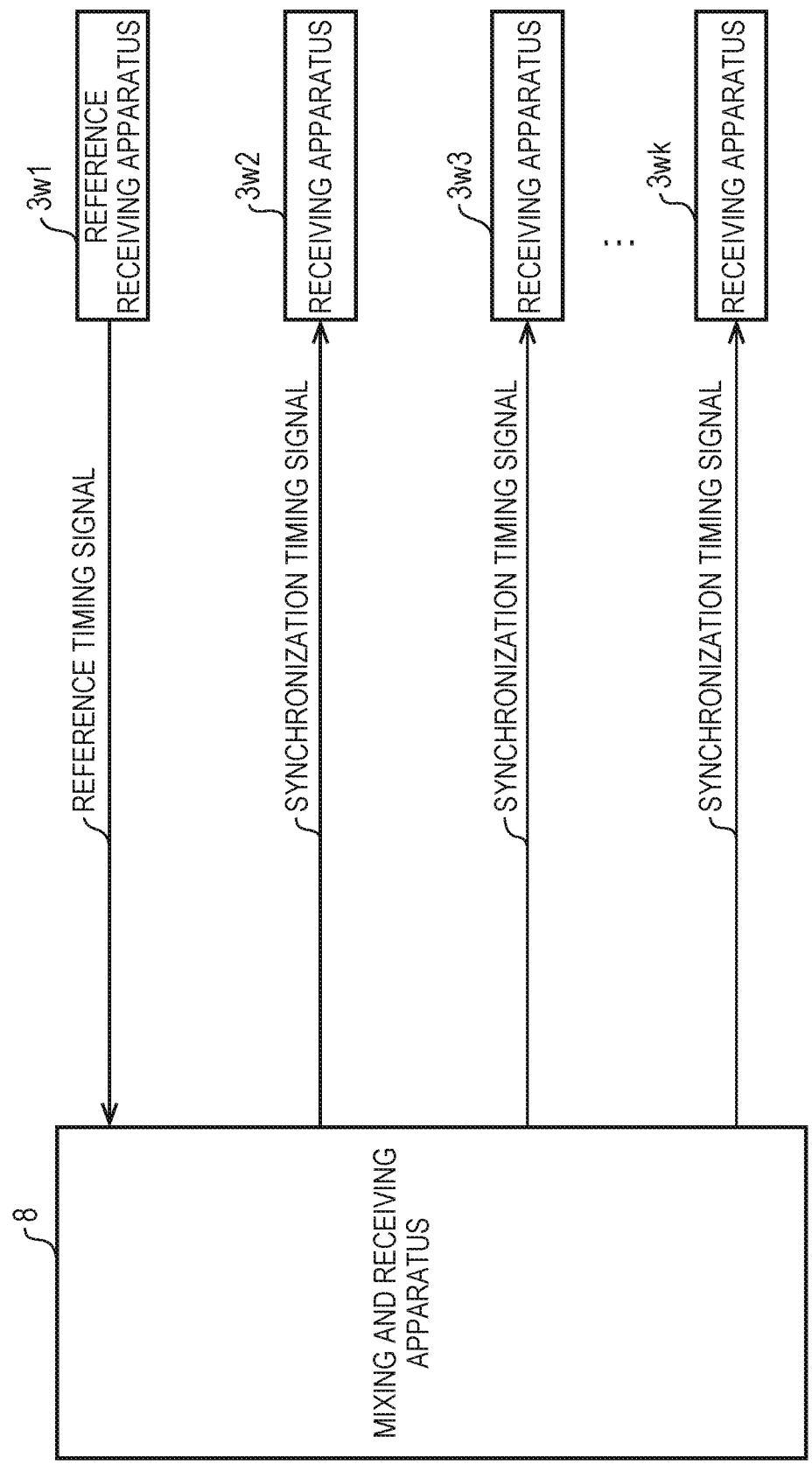
FIG. 10 is a diagram illustrating wireless synchronization in the wireless microphone system.

FIG. 10 is a diagram illustrating wireless synchronization in the wireless microphone system 5. The reference receiving apparatus (for example, the receiving apparatus 3w1) transmits the reference timing signal to the mixing and receiving apparatus 8. Here, in a case of the main wireless microphone system 5A, the main reference receiving apparatus 3Aw1 independently generates the wireless control signal and transmits the wireless control signal to a main mixing and receiving apparatus 8A. On the other hand, the respective sub reference receiving apparatuses 3Bw1 and 3Cw1 of the sub wireless microphone systems 5B and 5C generate the reference timing signal for synchronizing with the wireless control signal transmitted by the main reference receiving apparatus 3Aw1 and respectively transmit sub mixing and receiving apparatuses 8B and 8C in the sub wireless microphone systems 5B and 5C.

When receiving the reference timing signal from the reference receiving apparatus (for example, the receiving apparatus 3w1), the mixing and receiving apparatus 8 generates a synchronization timing signal for synchronizing with the reference timing signal and transmits the synchronization timing signal to the other receiving apparatuses 3w2, 3w3, and 3wk. The other receiving apparatuses 3w2, 3w3, . . . , and 3wk are synchronized with the synchronization timing signal received from the mixing and receiving apparatus 8 and perform the wireless communication with the plurality of microphone slave devices 2, to which the other receiving apparatuses 3w2, 3w3, . . . , and 3wk belong, by a start position of a radio frame being matched with the synchronization timing signal.

In this way, the receiving apparatuses 3 included in all of the main wireless microphone systems 5A are synchronized based on the wireless control signal periodically transmitted by the main reference receiving apparatus 3Aw1 of the main wireless microphone system 5A.

Figure 11:
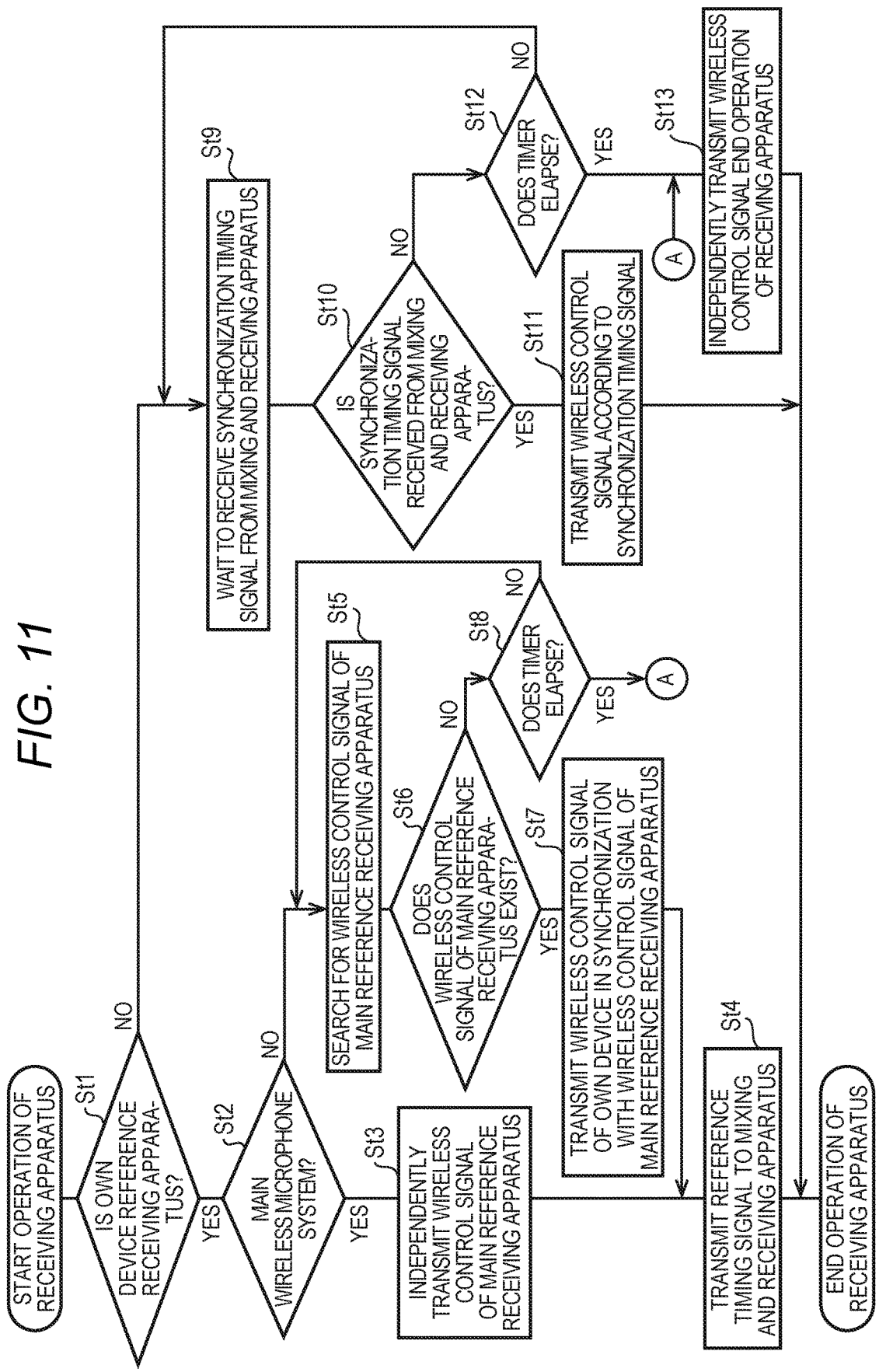
FIG. 11 is a flowchart illustrating an operation procedure of the receiving apparatus.

FIG. 11 is a flowchart illustrating an operation procedure of the receiving apparatus 3. The receiving apparatus 3 starts an operation by the power-on. The controller 20 of the receiving apparatus 3 determines whether or not the receiving apparatus 3 is a reference receiving apparatus (SU). In a case where the mixing and receiving apparatus 8 sets the reference receiving apparatus, the controller 20 communicates with the mixing and receiving apparatus 8 and receives setting information from the mixing and receiving apparatus 8 so as to determine whether or not the receiving apparatus 3 is a reference receiving apparatus. In addition, based on the received setting information, the controller 20 writes a value indicating that the receiving apparatus 3 is a reference receiving apparatus in the storage unit 25. Therefore, by reading contents of the storage unit 25, it can be determined whether or not the receiving apparatus 3 is the reference receiving apparatus. The determination of the reference receiving apparatus is not limited thereto. For example, in a case where the wireless control signal having a strong signal level periodically transmitted cannot be received through the radio unit 21, the controller 20 may determine that the receiving apparatus 3 is the reference receiving apparatus. On the other hand, in a case where the wireless control signal having the strong signal level periodically transmitted can be received, the controller 20 may not determine that the receiving apparatus 3 is the reference receiving apparatus.

The controller 20 determines whether or not the wireless microphone system, to which the receiver 3 belongs, is a main wireless microphone system (St2). In a case of the main wireless microphone system, the controller 20 independently generates the wireless control signal and transfers the wireless control signal to the radio controller 31, and periodically transmits the wireless control signal via the radio unit 21 (St3). Furthermore, the controller 20 transmits the reference timing signal synchronized with the wireless control signal, to the mixing and receiving apparatus 8 (St4). After then, the controller 20 terminates the processes in FIG.

11. The mixing and receiving apparatus 8 transmits the synchronization timing signal synchronized with the reference timing signal to the other receiving apparatus 3.

On the other hand, in a case of the sub wireless microphone system in step St2, the controller 20 searches for the wireless control signal transmitted from the main reference receiving apparatus 3Aw1 (St5). The controller 20 determines whether or not the wireless control signal is found (St6). In a case where the wireless control signal is found, the controller 20 transmits the wireless control signal, synchronized with the wireless control signal of the main reference receiving apparatus 3Aw1, of the receiving apparatus 3 (St7). After then, the process of the controller 20 moves to step St4.

In addition, in a case where the wireless control signal is not found in step St6, the controller 20 determines whether or not the embedded timer elapses a predetermined time (St8). Here, the predetermined time is, for example, a sufficient time until the wireless control signal is received from the main reference receiving apparatus and is synchronized. In a case where the timer does not elapse the predetermined time, the controller 20 returns to step St5 and searches the wireless control signal transmitted from the main reference receiving apparatus 3Aw1. On the other hand, in a case where the timer elapses the predetermined time, the sub reference receiving apparatus 3Bw1 of the sub wireless microphone system 5B stops to synchronize with the main reference receiving apparatus 3Aw1 of the main wireless microphone system 5A. In this case, the controller 20 of the sub reference receiving apparatus 3Bw1 independently generates the wireless control signal used in the sub wireless microphone system 5B and transmits the wireless control signal (St13). After then, the controller 20 terminates the processes in FIG. 11.

In addition, in a case where the receiving apparatus 3 is not the reference receiving apparatus in step St1, the controller 20 waits to receive the synchronization timing signal from the mixing and receiving apparatus 8 via the radio unit 21 (St9). The controller 20 determines whether or not the synchronization timing signal from the mixing and receiving apparatus 8 is detected (St10). In a case where the synchronization timing signal is detected, the controller 20 transmits the wireless control signal according to the synchronization timing signal (St11). After then, the controller 20 terminates the processes in FIG. 11.

On the other hand, in a case where the synchronization timing signal from the mixing and receiving apparatus 8 is not detected in step St10, the controller 20 determines whether or not the embedded timer elapses a predetermined time (St12). Here, the predetermined time is, for example, a sufficient time until the synchronization timing signal is received from the mixing and receiving apparatus and is synchronized. In a case where the timer does not elapse the predetermined time, the process of the controller 20 returns to step St9 and the controller 20 waits to receive the synchronization timing signal from the mixing and receiving apparatus 8. On the other hand, in a case where the timer elapses the predetermined time, the receiving apparatus 3 stops to synchronize with the reference receiving apparatus (for example, the receiving apparatus 3w1). In this case, the controller 20 of the reference receiving apparatus (for example, the receiving apparatus 3w1) independently generates the wireless control signal used in the wireless microphone system and transmits the wireless control signal (St13). After then, the controller 20 terminates the processes in FIG. 11.

Figure 12:
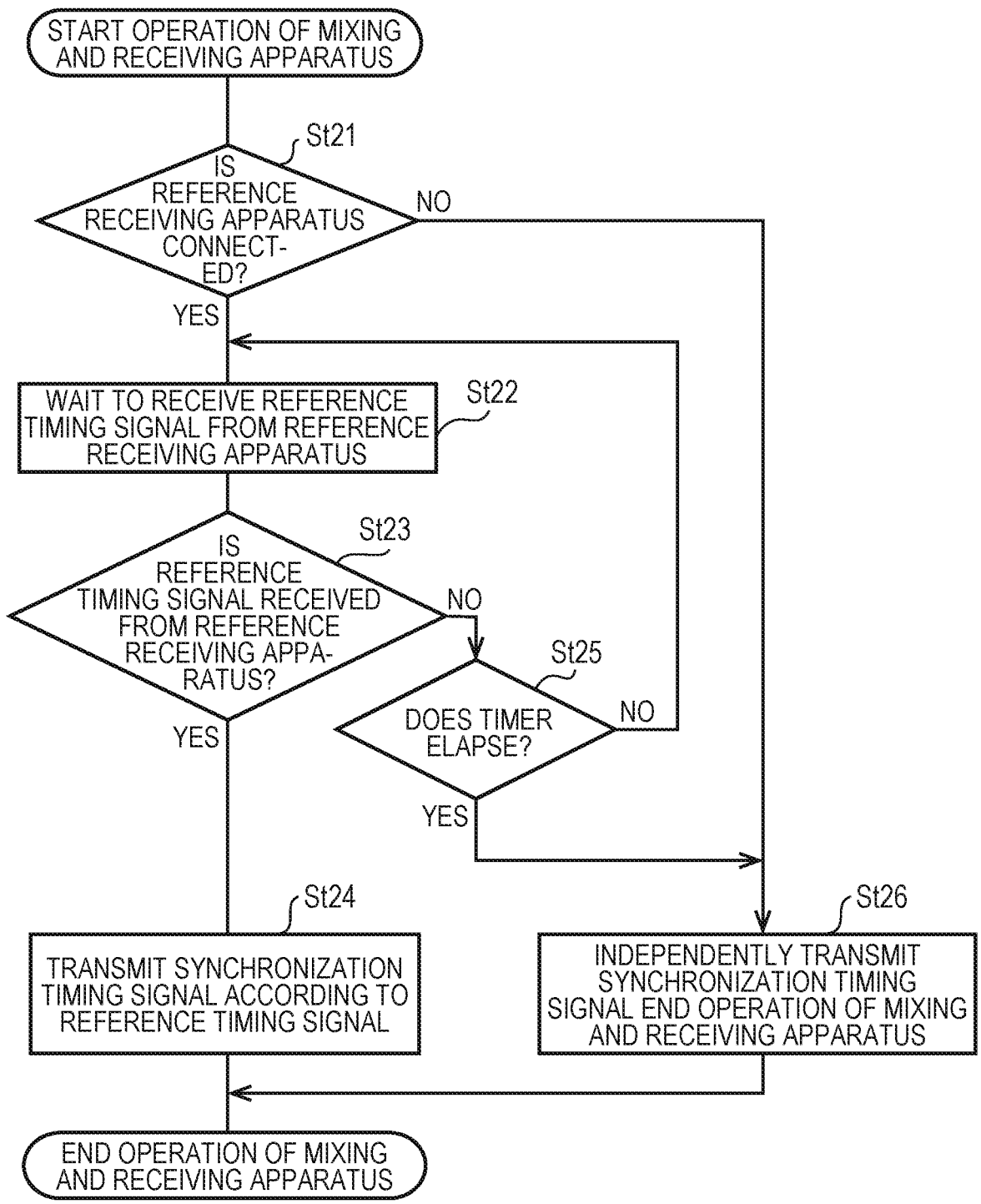
FIG. 12 is a flowchart illustrating an operation procedure of the mixing and receiving apparatus.

FIG. 12 is a flowchart illustrating an operation procedure of the mixing and receiving apparatus 8. The mixing and receiving apparatus 8 starts an operation by the power-on. The mixer controller 80 of the mixing and receiving apparatus 8 determines whether or not the mixing and receiving apparatus 8 is connected with the reference receiving apparatus (for example, the receiving apparatus 3w1) (St21). In a case where the mixing and receiving apparatus 8 is connected with the reference receiving apparatus (for example, the receiving apparatus 3w1), the mixer controller 80 waits to receive the reference timing signal from the reference receiving apparatus (for example, the receiving apparatus 3w1) (St22). The mixer controller 80 determines whether or the reference timing signal is received (St23). In a case of receiving the reference timing signal, the mixer controller 80 transmits the synchronization timing signal according to the reference timing signal to the other receiving apparatus 3 (St24). After then, the mixer controller 80 terminates the processes in FIG. 12.

On the other hand, in a case where the reference timing signal is not received in step St23, the mixer controller 80 determines whether or not the embedded timer elapses a predetermined time (St25). Here, the predetermined time is, for example, a time until the reference timing signal is received from the reference receiving apparatus (for example, the receiving apparatus 3w1). In a case where the timer does not elapse the predetermined time, the process of the mixer controller 80 returns to step St22 and the mixer controller 80 waits to receive the reference timing signal from the reference receiving apparatus (for example, the receiving apparatus 3w1). On the other hand, in a case where the timer elapses the predetermined time, the mixer controller 80 independently generates the synchronization timing signal used in the wireless microphone system 5 and transmits the synchronization timing signal (St26). After then, the mixer controller 80 terminates the processes in FIG. 12.

Here, the main reference receiving apparatus transmits the reference timing signal synchronized with the wireless control signal of the own device to the mixing and receiving apparatus, but the main reference receiving apparatus may generate the wireless control signal, which is a synchronization signal, according to the synchronization timing signal from the mixing and receiving apparatus and may transmit the wireless control signal. That is, the mixing and receiving apparatus may generate the reference timing signal and may transmit the reference timing signal to the main reference receiving apparatus.

As described above, the wireless microphone system 5 according to Embodiment 1 includes the main wireless microphone system 5A (a first receiving apparatus segment, that is, an example of the own segment) which includes the plurality of receiving apparatuses 3 (an example of a first slave receiving apparatus, for example, the main reference receiving apparatus 3Aw1, and the main receiving apparatuses 3Aw2 and 3Aw3) capable of respectively and wirelessly communicating with one or more microphone slave devices 2 and the mixing and receiving apparatus 8 (an example of a first master receiving apparatus, for example, the main mixing and receiving apparatus 8A) connected with the plurality of receiving apparatuses 3. The wireless microphone system 5 includes at least one sub wireless microphone system 5B (a second receiving apparatus segment, that is, an example of the other segment) which includes the plurality of receiving apparatuses 3 (an example of a second slave receiving apparatus, for example, the sub reference receiving apparatuses 3Bw1 and 3Cw1, and the sub receiving apparatuses 3Bw2, 3Bw3, 3Cw2, and 3Cw3)

capable of respectively and wirelessly communicating with one or more microphone slave devices 2 and the sub mixing and receiving apparatus (an example of a second master receiving apparatus, for example, the sub mixing and receiving apparatuses 8B and 8C) connected with the plurality of receiving apparatuses 3. The main reference receiving apparatus 3Aw1 (an example of the first slave receiving apparatus as a reference) among the plurality of receiving apparatuses repeatedly transmits the wireless control signal for controlling synchronization between the main wireless microphone system 5A and the sub wireless microphone systems 5B and 5C. The sub reference receiving apparatuses 3Bw1 and 3Cw1 (an example of the second slave receiving apparatus as a reference) among the plurality of receiving apparatuses transmits the reference timing signal for being synchronized in the sub wireless microphone systems 5B and 5C of the own device by synchronizing with the wireless control signal, to the sub mixing and receiving apparatuses 8B and 8C. According to the reference timing signal, the sub mixing and receiving apparatuses 8B and 8C transmits the synchronization timing signal for the wireless synchronization in the sub wireless microphone systems 5B and 5C of the own device, to the other sub receiving apparatuses 3Bw2, 3Bw3, 3Cw2, and 3Cw3 (the second slave receiving apparatus, that is, an example of the other receiving apparatuses) of the sub wireless microphone systems 5B and 5C of the own device.

As a result, even in a case where the coexistent areas ra12 and ra13 exist in the respective coverage areas ra1, ra2, and ra3 of the plurality of wireless microphones system (for example, the main wireless microphone system 5A and the sub wireless microphone systems 5B and 5C), the wireless microphone system 5 can precisely realize the wireless synchronization between the respective wireless microphone systems. Therefore, since in the wireless microphone system 5, it is possible to precisely avoid a collision of the audio signals between the respective wireless microphone systems (for example, the main wireless microphone system 5A and the sub wireless microphone systems 5B and 5C), it is possible to support the output of a high-quality audio signal in each of the wireless microphone systems.

In addition, the main reference receiving apparatus 3Aw1 transmits the reference timing signal to the main mixing and receiving apparatus 8A. According to the reference timing signal, the main mixing and receiving apparatus 8A transmits the synchronization timing signal for the wireless synchronization in the main wireless microphone system 5A of the own device, to the other main receiving apparatuses 3Aw2 and 3Aw3 in the main wireless microphone system 5A of the own device. As a result, the synchronization in the main wireless microphone system 5A can be established.

In addition, the sub reference receiving apparatus 3Bw1 and the sub receiving apparatuses 3Bw2 and 3Bw3 is synchronized based on the synchronization timing signal and adjust the start position of the frame used in the wireless communication with the microphone slave device 2. As a result, in each of the wireless microphone systems (for example, the main wireless microphone system 5A and the sub wireless microphone systems 5B and 5C), the receiving apparatuses other than the reference receiving apparatus can be synchronized.

In Embodiment 1 described above, among the plurality of receiving apparatuses 3 connected to the mixing and receiving apparatus 8, which one of the receiving apparatuses is the reference receiving apparatus is not particularly limited. For example, among the plurality of ports P (terminals), provided in the mixing and receiving apparatus 8, connected with the plurality of receiving apparatuses 3 through the signal line 140 (wired), a first port P1 (a port located on a leftmost side of FIG. 1) as an example of a predetermined terminal may be set to a port to which the reference receiving apparatus (for example, the receiving apparatus 3w1) is connected. That is, the mixing and receiving apparatus 8 also may set the receiving apparatus, connected to the first port P1, to the reference receiving apparatus (for example, the receiving apparatus 3w1). As a result, the user can directly and easily set the reference receiving apparatus by manually connecting the signal line 140 to the first port P1 from an outside of a housing of the mixing and receiving apparatus.

In addition, according to a value set to the mixing and receiving apparatus, one of the plurality of ports may be set as a port to which the reference receiving apparatus is connected. Here, the operation unit 83 of the mixing and receiving apparatus 8 is provided with the DIP switch 83z (an example of a setting unit) which can receive a user input. According to a value (setting information) of the DIP switch 83z when the user input is received (the user operates the switch ON/OFF), the mixing and receiving apparatus 8 sets the port to which the reference receiving apparatus (for example, the receiving apparatus 3w1) is connected. For example, in a case where the DIP switch 83z has 3 bits, the ports corresponding to values 0 to 7 are set to the port P to which the reference receiving apparatus (for example, the receiving apparatus 3w1) is connected. As a result, it is possible to manage the settings of the reference receiving apparatus in the mixing and receiving apparatus. Therefore, it is possible to easily avoid that the reference receiving apparatus is changed.

The external I/F unit 89 (an example of a connection unit) embedded in the mixing and receiving apparatus 8 is connected to a PC (an example of an external device) by a LAN or a universal serial bus (USB). According to data (setting information) received from the PC via the external I/F unit 89, the mixing and receiving apparatus 8 may set one port among the plurality of ports P to the port to which the reference receiving apparatus is connected. As a result, it is possible to set the reference receiving apparatus from the outside to the mixing and receiving apparatus. Therefore, it is possible to remotely set the mixing and receiving apparatus.

In this way, among the plurality of ports provided in the mixing and receiving apparatus, a predetermined port can be set to the port to which the reference receiving apparatus is connected. Therefore, even if malfunction occurs in the port to which the reference receiving apparatus is connected, the port can be easily switched into another port and the wireless synchronization can be continued.

Modification Example 1 of Embodiment 1

In each of the wireless microphone systems, in a case where wiring between the mixing and receiving apparatus and each of the receiving apparatuses becomes long, a delay occurs between the mixing and receiving apparatus and each of the receiving apparatuses. It is necessary to recognize a delay time so that a clock deviation in the radio frame does not occur due to the delay time.

Figure 13:
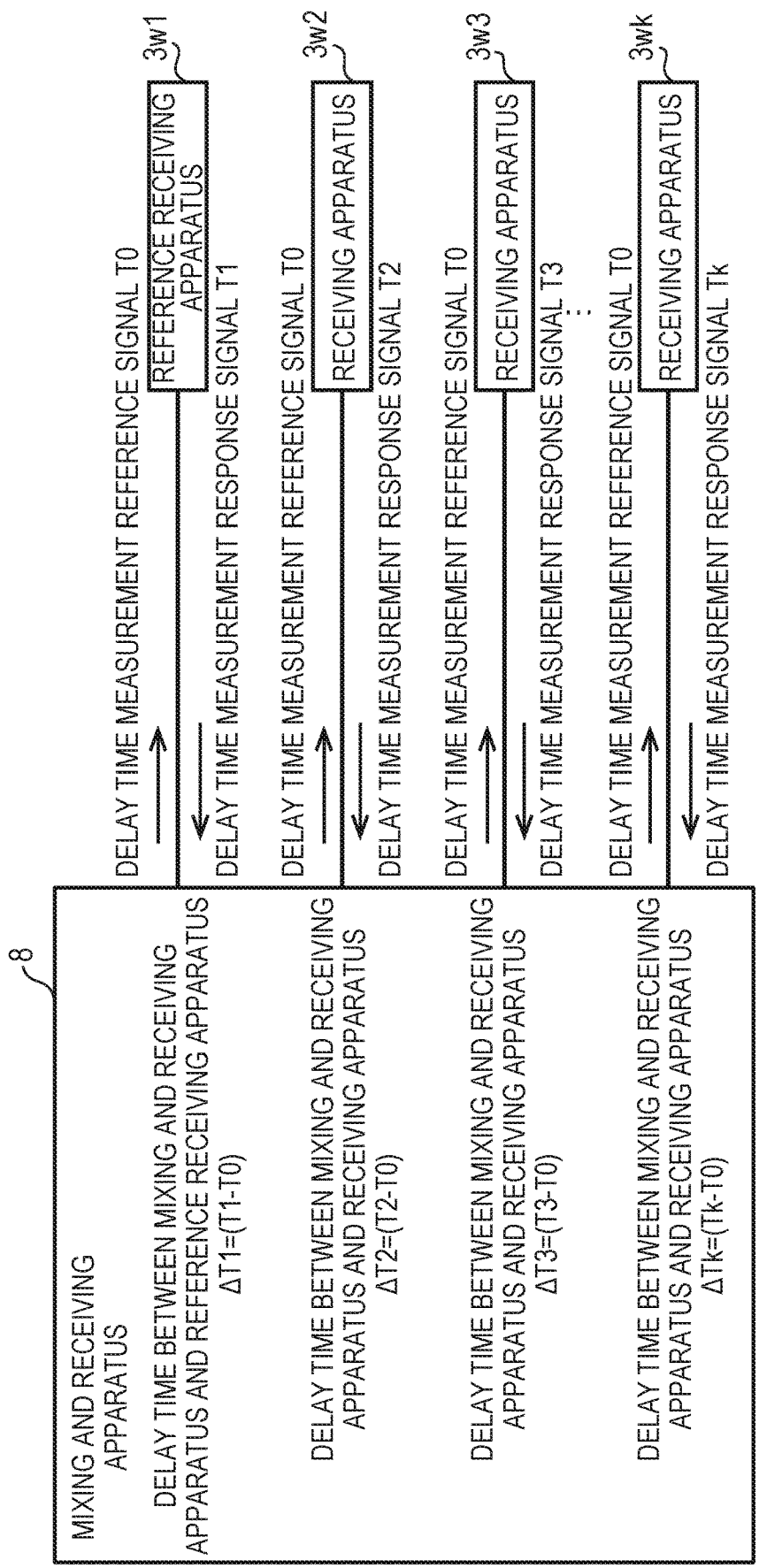
FIG. 13 is a diagram illustrating measurement of a delay time between a mixing and receiving apparatus and a receiving apparatus according to Modification Example 1 of Embodiment 1.

FIG. 13 is a diagram illustrating measurement of the delay time between the mixing and receiving apparatus 8 and the receiving apparatus 3 according to Modification Example 1 of Embodiment 1. The mixing and receiving apparatus 8 transmits a delay time measurement reference signal T0 to the reference receiving apparatus (for example, the receiving apparatus 3w1). When receiving the delay time measurement reference signal T0 from the mixing and receiving apparatus 8, the reference receiving apparatus (for example, the receiving apparatus 3w1) returns a delay time measurement response signal T1 immediately or after a predetermined time elapse. When receiving the delay time measurement response signal T1, the mixing and receiving apparatus 8 calculates a delay time $\Delta T1$ (=T1−T0) between the mixing and receiving apparatus and the reference receiving apparatus.

In the same manner, the mixing and receiving apparatus 8 transmits the delay time measurement reference signal T0 to the receiving apparatus 3w2. When receiving the delay time measurement reference signal T0 from the mixing and receiving apparatus 8, the receiving apparatus 3w2 returns a delay time measurement response signal T2 immediately or after a predetermined time elapse. When receiving the delay time measurement response signal T2, the mixing and receiving apparatus 8 calculates a delay time $\Delta T2$ (=T2−T0) between the mixing and receiving apparatus and the reference receiving apparatus. After then, in the same manner, a delay time $\Delta Tk$ (=Tk−T0) is calculated for the last receiving apparatus 3wk connected to the mixing and receiving apparatus 8.

The mixing and receiving apparatus 8 performs the transmission so as to obtain the synchronization timing signal reaching each of the receiving apparatuses 3 in consideration of the delay times $\Delta T1$ to $\Delta Tk$ corresponding to the respective receiving apparatuses 3. For example, the mixing and receiving apparatus 8 transmits a time ($\Delta Tmax - \Delta Tk$) obtained by subtracting the delay time $\Delta Tk$ of each of the receiving apparatuses 3 from the longest delay time $\Delta Tmax$ among all of the receiving apparatuses 3, in addition to a transmission timing of the synchronization timing signal. As a result, the transmission is performed so that the synchronization timing signal reaches all of the receiving apparatuses 3 at the same time.

Generally, the measurement of the delay time between the mixing and receiving apparatus and each of the receiving apparatuses is performed only once at the time of an initial setting. In addition, in a case where a layout of the wireless microphone system is changed and a length of the wiring is changed, the measurement of the delay time between the mixing and receiving apparatus and each of the receiving apparatuses may be performed.

Figure 14:
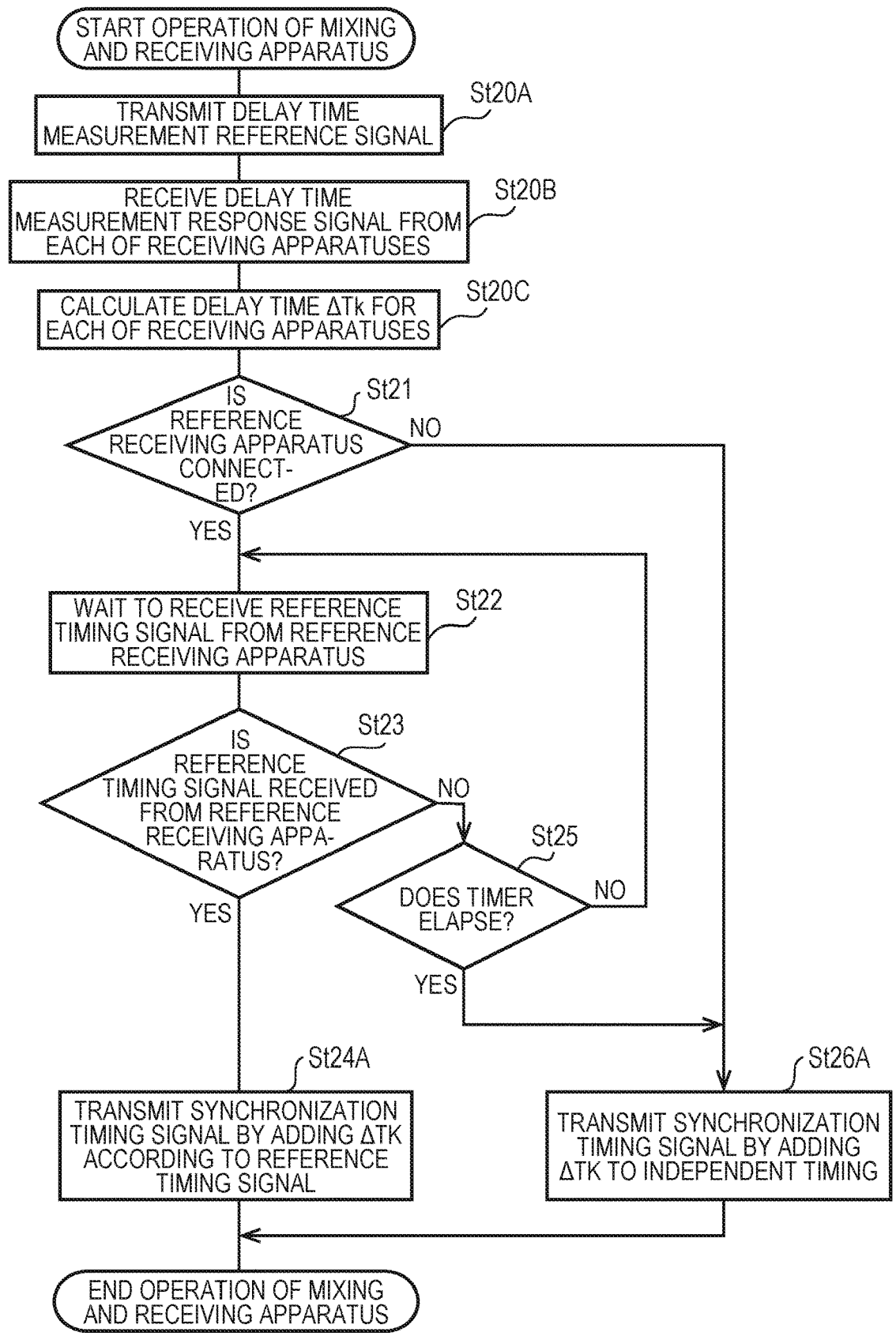
FIG. 14 is a flowchart illustrating an operation procedure of the mixing and receiving apparatus.

FIG. 14 is a flowchart illustrating an operation procedure of the mixing and receiving apparatus 8. The processes in the same step as the process in the step illustrated in FIG. 12 is denoted by the same step number, and description thereof will be omitted. The mixer controller 80 includes the reference receiving apparatus (for example, the receiving apparatus 3w1) and transmits the delay time measurement reference signal T0 to all of the receiving apparatuses 3 (St20A). The mixer controller 80 receives the delay time measurement response signals T1, T2, . . . , and Tk from each of the receiving apparatuses 3 (St20B). The mixer controller 80 calculates the delay time $\Delta Tk$ (=Tk−T0) for each of the receiving apparatuses 3 (St20C).

After processing steps St21 to St23 illustrated in FIG. 12, the mixer controller 80 transmits the synchronization timing signal at a timing considering the delay time $\Delta Tk$ to the reference timing signal (St24A). That is, the mixer controller 80 transmits the synchronization timing signal at a timing obtained by adding the time ($\Delta Tmax - \Delta Tk$), obtained by subtracting the delay time $\Delta Tk$ of each of the receiving apparatuses 3 from the longest delay time $\Delta Tmax$, to the reference timing signal.

In addition, after processing step St25, the mixer controller 80 transmits the synchronization timing signal at a timing considering the delay time $\Delta Tk$ to an independent timing signal (St26A). That is, the mixer controller 80 transmits the synchronization timing signal at a timing obtained by adding the time ($\Delta Tmax - \Delta Tk$), obtained by subtracting the delay time $\Delta Tk$ of each of the receiving apparatuses 3 from the longest delay time $\Delta Tmax$, to the independent timing signal. After processing steps St24A and St25A, the mixer controller 80 terminates the processes illustrated in FIG. 14.

As described above, in the wireless microphone system 5 according to Modification Example 1 of Embodiment 1, the reference receiving apparatus (for example, the receiving apparatus 3w1) stores the delay time $\Delta Tk$ (an example of transmission delay time information) of the signals between the plurality of receiving apparatuses 3w2 and 3w3 connected to the respective own device for each of the plurality of receiving apparatuses 3w2 and 3w3 and transmits the synchronization timing signal based on the delay time $\Delta Tk$ for each of the plurality of main receiving apparatuses 3Aw2 and 3Aw3. As a result, even in a case where the wiring between the mixing and receiving apparatus and each of the receiving apparatuses becomes long and a delay occurs in the signal, not according to the individual delay time, but the synchronization timing signal can be transmitted to all of the receiving apparatuses 3 at the same time.

Modification Example 2 of Embodiment 1

In Embodiment 1 described above, the sub reference receiving apparatus of the sub wireless microphone system is synchronized with the wireless control signal transmitted from the main reference receiving apparatus of the main wireless microphone system, but the sub reference receiving apparatus of the sub wireless microphone system may be synchronized with the other system.

Figure 15:
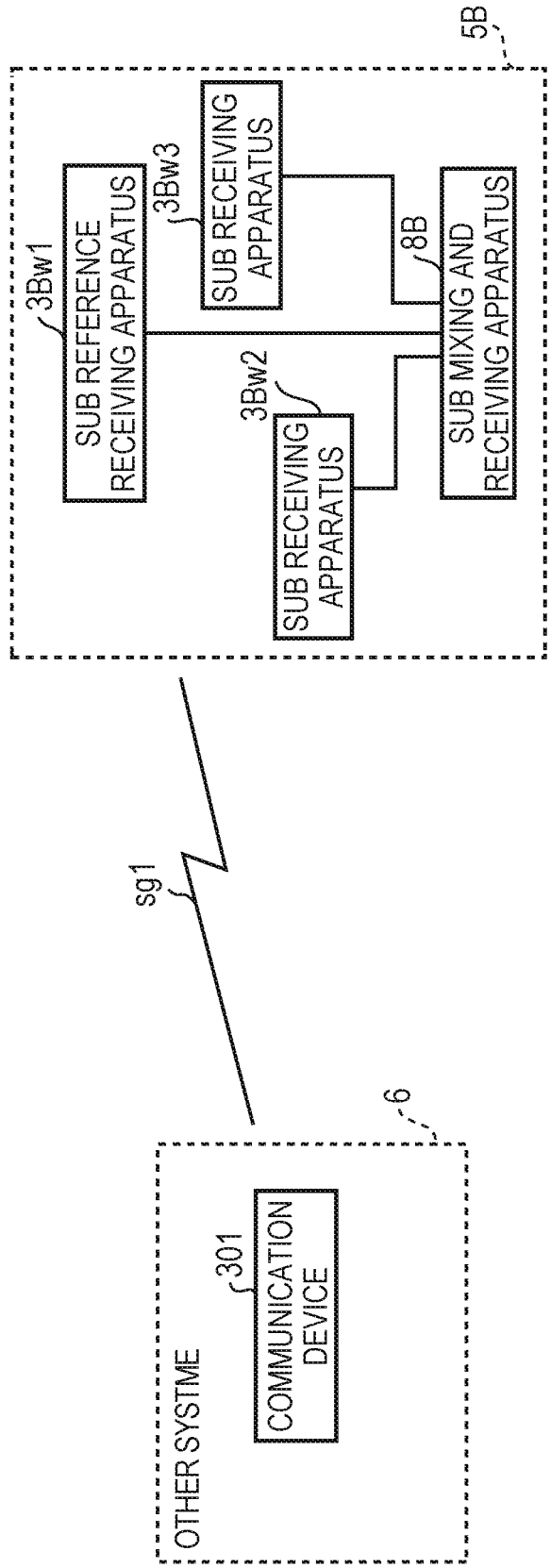
FIG. 15 is a diagram illustrating that synchronization of a sub wireless microphone system using another system according to Modification Example 2 of Embodiment 1 is established.

FIG. 15 is a diagram illustrating that synchronization of the sub wireless microphone system 5B using another system 6 according to Modification Example 2 of Embodiment 1 is established. The sub reference receiving apparatus 3Bw1 registers a communication device ID to be searched of the other system 6 in the storage unit 25 in advance so as to establish the wireless synchronization. The sub reference receiving apparatus 3Bw1 searches for a communication device having the registered communication device ID, receives a signal sg1 transmitted from a communication device 301, and generates the reference timing signal synchronized with the signal sg1. The sub reference receiving apparatus 3Bw1 transmits the generated reference timing signal to the sub mixing and receiving apparatus 8B. The sub mixing and receiving apparatus 8B transmits the synchronization timing signal generated based on the reference timing signal to the other the sub receiving apparatuses 3Bw2 and 3Bw3 in the same wireless microphone system 5B. As a result, in the sub wireless microphone system 5B, the wireless synchronization is established.

As described above, according to the wireless microphone system of Modification Example 2 of Embodiment 1, the sub wireless microphone system can perform the wireless synchronization with the other systems which are not the same wireless microphone system, and can coexist without a sound noise.

Modification Example 3 of Embodiment 1

Figure 16:
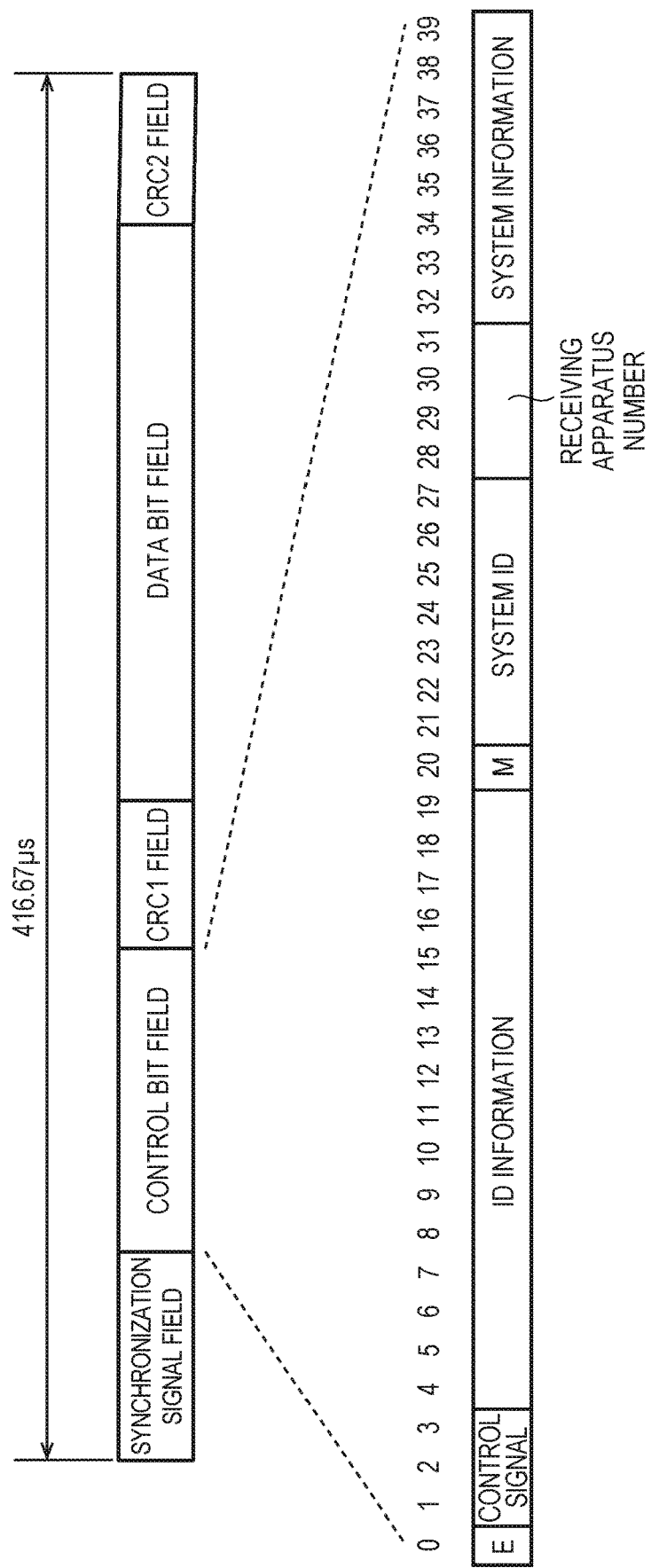
FIG. 16 is a diagram illustrating a configuration of a control bit field according to Modification Example 3 of Embodiment 1.

FIG. 16 is a diagram illustrating a configuration of the control bit field according to Modification Example 3 of Embodiment 1. The control bit field included in the wireless control signal transmitted by the main reference receiving apparatus includes a bit M for determining whether the received signal is a reference signal to be synchronized. The bit M may be configured by 1 bit or a plurality of bits.

For example, in a case where the bit M is a value 1, it is determined that the wireless control signal is a main reference signal and the sub reference receiving apparatus transmits the reference timing signal so as to synchronize with the wireless control signal transmitted by the main reference receiving apparatus. On the other hand, in a case where the bit M is a value 0, it is determined that the wireless control signal is not the main reference signal and the wireless synchronization is not performed with the wireless control signal.

As described above, according to the wireless microphone system of Modification Example 3 of Embodiment 1, it is possible to easily synchronize with the same wireless microphone system and it is possible to synchronize with not the wireless microphone system but the other system by applying the bit M to the wireless control signal. Therefore, it is possible to construct a general-purpose system which can coexist with the same wireless microphone system as well as the other systems without a sound noise.

Details to Contents of Embodiment 2

In Embodiment 1, in order to establish the wireless synchronization, the main reference receiving apparatus in the main wireless microphone system transmits the reference timing signal to the mixing and receiving apparatus in the own system (that is, the main wireless microphone system) and transmits the wireless control signal (see above) to the sub reference receiving apparatus of the sub wireless microphone system. The receiving apparatus in the own system (the main wireless microphone system) is synchronized with the other receiving apparatus in the own system according to the synchronization timing signal from the mixing and receiving apparatus based on the reference timing signal, and then performs the wireless communication. In addition, in the sub wireless microphone system, when receiving the wireless control signal from the main reference receiving apparatus of the main wireless system, the sub reference receiving apparatus transmits the reference timing signal to the mixing and receiving apparatus in the own (that is, the sub wireless microphone system). The receiving apparatus in the own system (the sub wireless microphone system) performs the wireless communication according to the synchronization timing signal from the mixing and receiving apparatus based on the reference timing signal.

All of the receiving apparatuses constituting the wireless microphone system are connected to the mixing and receiving apparatus by wired, for example, a power over ethernet (PoE) and receive power from the mixing and receiving apparatus. In a case where the power supply of the mixing and receiving apparatus in the main wireless microphone system is switched off by an operation of the user, the main reference receiving apparatus is also turned off and stops to operate, and the wireless control signal from the main reference receiving apparatus is not transmitted. As a result, each of the receiving apparatuses wirelessly synchronized with the wireless control signal loses the wireless synchronization. Accordingly, a clock deviation occurs between the different sub wireless microphone systems and a communication collision occurs in a long period, so that sound quality is reduced.

Therefore, in Embodiment 2 described below, an example of the wireless microphone system capable of maintaining the wireless control signal transmitted by the main reference receiving apparatus even if the power supply of the mixing and receiving apparatus in the main wireless microphone system is turned off will be described.

Embodiment 2

In the wireless microphone system according to Embodiment 2, the same reference numerals are used for the same components as those constituting the wireless microphone system 5 according to Embodiment 1, and description thereof is simplified or omitted.

Figure 17:
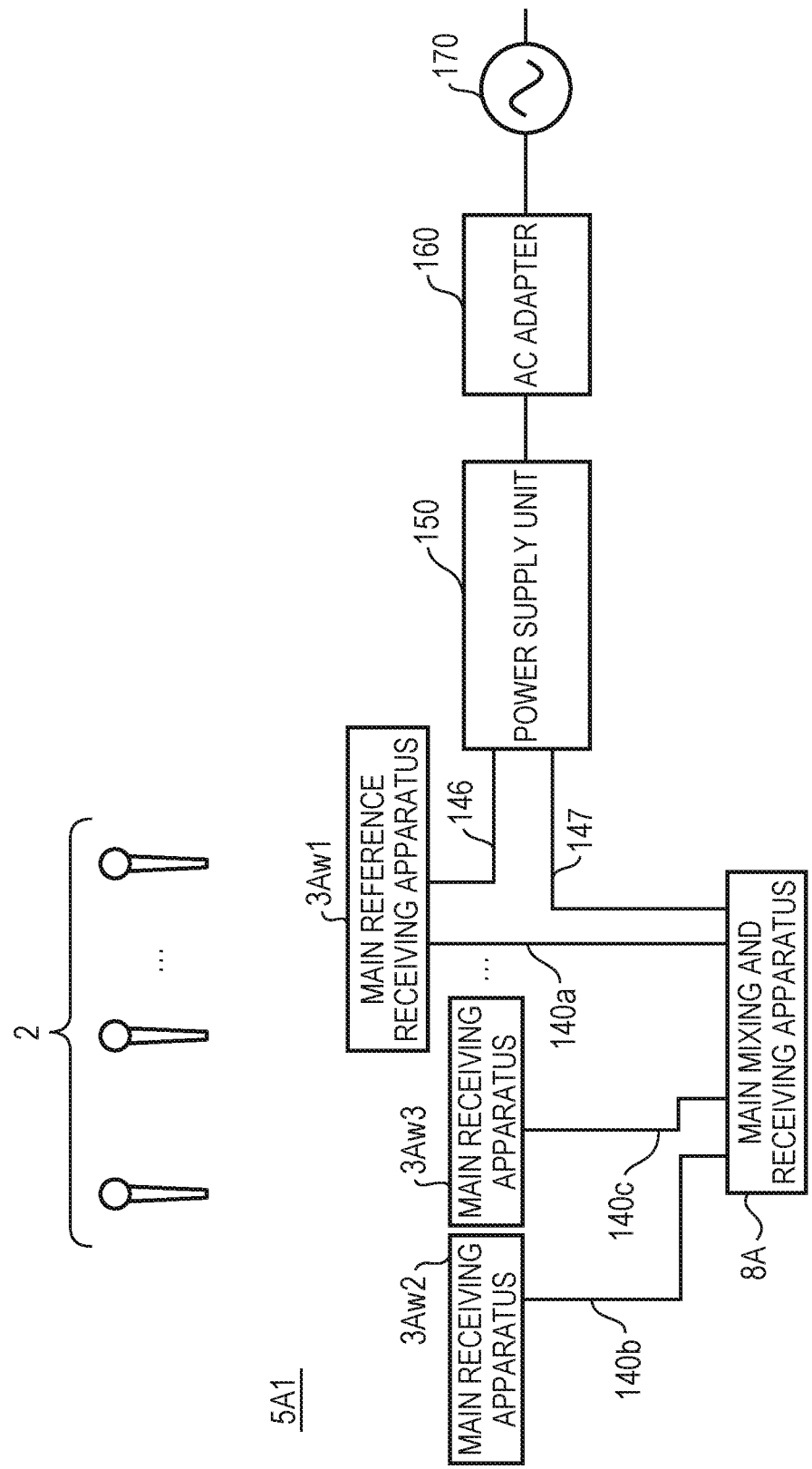
FIG. 17 is a diagram illustrating a configuration of a main wireless microphone system according to Embodiment 2.

FIG. 17 is a diagram illustrating a configuration of a main wireless microphone system 5A1 according to Embodiment 2. The main wireless microphone system 5A1 according to Embodiment 2 is configured to further include a power supply unit 150 and an AC adapter 160 in addition to the configuration of the main wireless microphone system 5A1 according to Embodiment 1.

A signal line 140a such as a power over ethernet (PoE) cable or the like is connected between the main reference receiving apparatus 3Aw1 and the main mixing and receiving apparatus 8A. The main reference receiving apparatus 3Aw1 transmits and receives the signal to and from the main mixing and receiving apparatus 8A via the signal line 140a and receives a power supply voltage from the main mixing and receiving apparatus 8A. In the same manner, signal lines 140b and 140c are respectively connected between the main receiving apparatuses 3Aw2 and 3Aw3 and the main mixing and receiving apparatus 8A. In a case where the signal lines 140a, 140b, and 140c are not particularly distinguished from one another, the signal lines 140a, 140b, and 140c are collectively referred to as the signal line 140. The main receiving apparatuses 3Aw2 and 3Aw3 transmit and receive the signal to and from the main mixing and receiving apparatus 8A via the signal lines 140b and 140c and receives the power supply voltage from the main mixing and receiving apparatus 8A.

When the main mixing and receiving apparatus 8A is powered off, the communication and the supply of the power supply voltage are cut off between the main reference receiving apparatus 3Aw1 and the main receiving apparatuses 3Aw2 and 3Aw3, and the main mixer receiving apparatus 8A.

A power line 146 for supplying the voltage from the power supply unit 150 to the main reference receiving apparatus 3Aw1 is connected between the power supply unit 150 and the main reference receiving apparatus 3Aw1. In a case where the main mixing and receiving apparatus 8A is powered off, the power supply unit 150 supplies the power to the main reference receiving apparatus 3Aw1 instead of the main mixing and receiving apparatus 8A.

In addition, a signal line 147 for detecting that the main mixing and receiving apparatus 8A is powered off is connected between the power supply unit 150 and the main mixing and receiving apparatus 8A. The AC adapter 160 is connected to a commercial power supply 170, inputs a commercial AC voltage, and supplies a constant voltage to the power supply unit 150.

The power supply unit 150 receives the constant voltage supplied from the AC adapter 160 and is activated all the time. When the power-off of the main mixing and receiving apparatus 8A is detected through the signal line 147, the power supply unit 150 supplies the power supply voltage to the main reference receiving apparatus 3Aw1 via the power line 146. As a result, the main reference receiving apparatus 3Aw1 maintains the ON state even when the main mixing and receiving apparatus 8A is powered off. On the other hand, the main receiving apparatuses 3Aw2, 3Aw3, . . . other than the main reference receiving apparatus 3Aw1 are at the off state by powering off the main mixing and receiving apparatus 8A.

Even when the main mixing and receiving apparatus 8A is powered off, the main reference receiving apparatus 3Aw1 operates by receiving the power supply voltage from the power supply unit 150, and periodically and repeatedly transmits the wireless control signal. The sub reference receiving apparatuses 3Bw1 and 3Cw1 in the sub wireless microphone systems 5B and 5C receive the wireless control signal transmitted from the main reference receiving apparatus 3Aw1 and generate the reference timing signal so as to match the start timing of the frame of the wireless communication. The configurations of the sub wireless microphone systems 5B and 5C are the same as those of the sub wireless microphone systems 5B and 5C according to Embodiment 1 described above. As a result, even when the main mixing and receiving apparatus 8A is powered off, the sub reference receiving apparatuses 3Bw1 and 3Cw1 in the sub wireless microphone systems 5B and 5C can maintain the wireless synchronization with the main wireless microphone system 5A.

Figure 18:
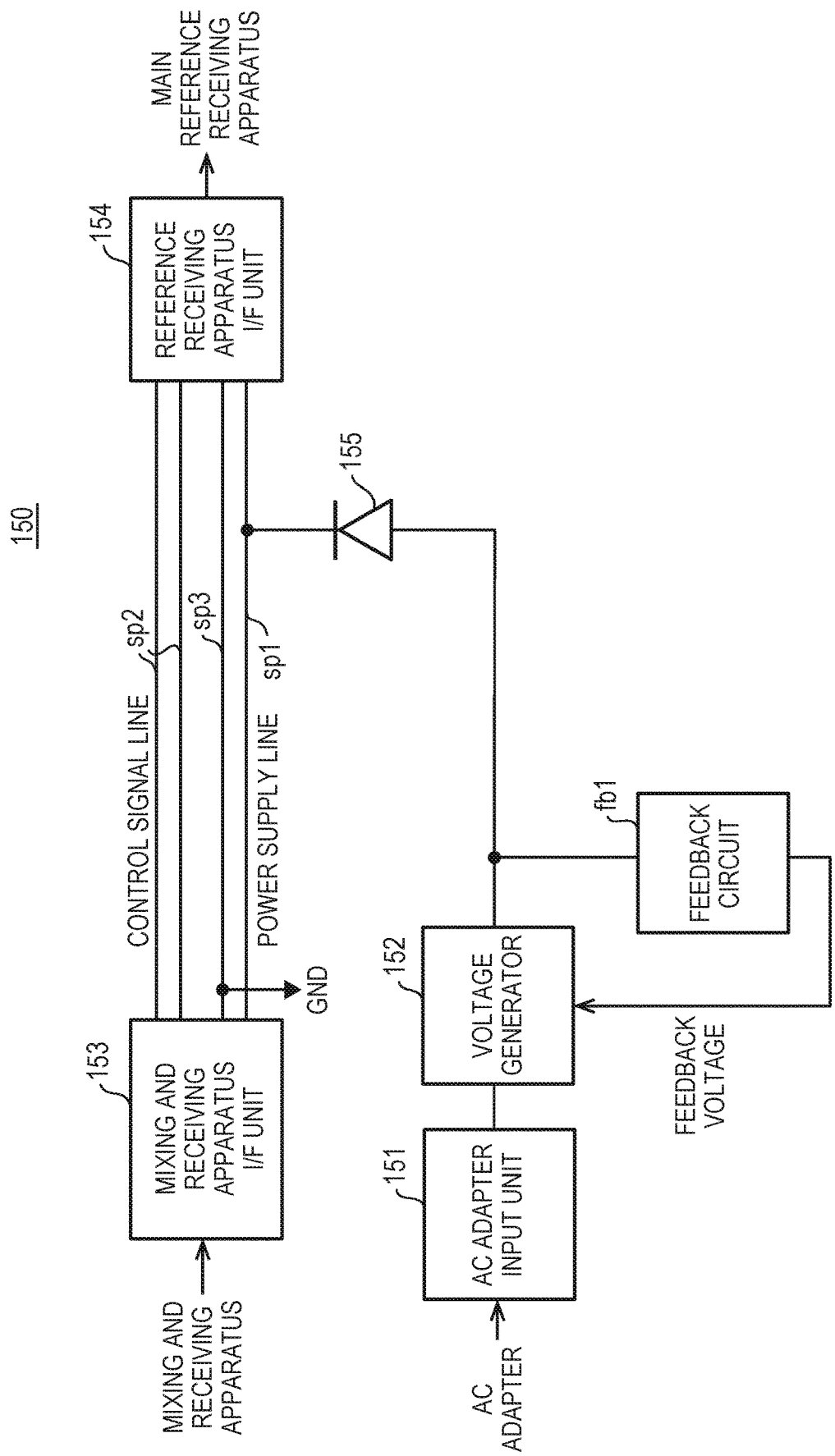
FIG. 18 is a diagram illustrating a configuration of a power supply unit.

FIG. 18 is a diagram illustrating a configuration of the power supply unit 150. The power supply unit 150 is configured to include an AC adapter input unit 151, a voltage generator 152, a mixing and receiving apparatus I/F unit 153, a reference receiving apparatus I/F unit 154, and a diode 155.

The AC adapter input unit 151 includes an input terminal, to which an output terminal of the AC adapter 160 is connected, and outputs the output voltage supplied from the AC adapter 160. The voltage generator 152 generates the output voltage supplied to the main reference receiving apparatus 3Aw1 based on the output voltage of the AC adapter 160 input via the AC adapter input unit 151.

The output voltage generated in the voltage generator 152 is applied to an anode of the diode 155. A cathode of the diode 155 is connected to a power supply line sp1 between the reference receiving apparatus I/F unit 154 and the mixing and receiving apparatus I/F unit 153. In addition, a control signal line sp2, a ground (GND) line sp3, and the like in addition to the power supply line sp1 are connected between the reference receiving apparatus I/F unit 154 and the mixing and receiving apparatus I/F unit 153.

Further, the reference receiving apparatus I/F unit 154 includes an output terminal, to which the power line 146 connected to the main reference receiving apparatus 3Aw1 is connected, and supplies the power supply voltage to the main reference receiving apparatus 3Aw1. The mixing and receiving apparatus I/F unit 153 includes an input terminal, to which the signal line 147 connected to the main mixing and receiving apparatus 8A is connected, and inputs a signal for detecting the power-off of the main mixing and receiving apparatus 8A or the like included in the signal line 147.

In a case where the main mixing and receiving apparatus 8A is powered on, that is, a case where the voltage of the power supply line sp1 is equal to or higher than a voltage obtained by subtracting a predetermined value from the output voltage of the voltage generator 152, the diode 155 is turned off. The predetermined value corresponds to a forward voltage for the diode 155 being conducted. Therefore, the voltage of the power supply line sp1 is output as it is to an output terminal of the reference receiving apparatus I/F unit 154.

On the other hand, in a case where the main mixing and receiving apparatus 8A is powered off, that is, a case where the voltage of the power supply line sp1 is smaller than the voltage obtained by subtracting the predetermined value from the output voltage of the voltage generator 152, the diode 155 is turned on (that is, is conducted). Therefore, the voltage of the power supply line sp1 is the voltage obtained by subtracting the predetermined value from the output voltage of the voltage generator 152. The forward voltage of the diode 155 is usually as small as approximately 0.6 V. Therefore, the voltage of the power supply line sp1 is approximately equal to the output voltage of the voltage generator 152. In this way, when the diode 155 is turned on, the output voltage of the voltage generator 152 is output to the output terminal of the reference receiving apparatus I/F unit 154.

The main reference receiving apparatus 3Aw1 receives the output voltage generated in the voltage generator 152 via the reference receiving apparatus I/F unit 154. The cathode of the diode 155 is also applied to an output terminal of the main mixing and receiving apparatus 8A. Since the output terminal of the main mixing and receiving apparatus 8A is high impedance, a current by the output voltage generated in the voltage generator 152 does not flow through the output terminal of the main mixing and receiving apparatus 8A and the output voltage generated in the voltage generator 152 is maintained.

Further, the voltage generator 152 inputs a feedback voltage from a feedback circuit fb1 and maintains the output voltage at a constant voltage. The feedback circuit fb1 can be formed at low cost by using, for example, a resistor. In addition, in a case where the output voltage generated by the voltage generator 152 is appropriate as the voltage to be supplied to the main reference receiving apparatus 3Aw1, the feedback circuit fb1 may be omitted.

Figure 19:
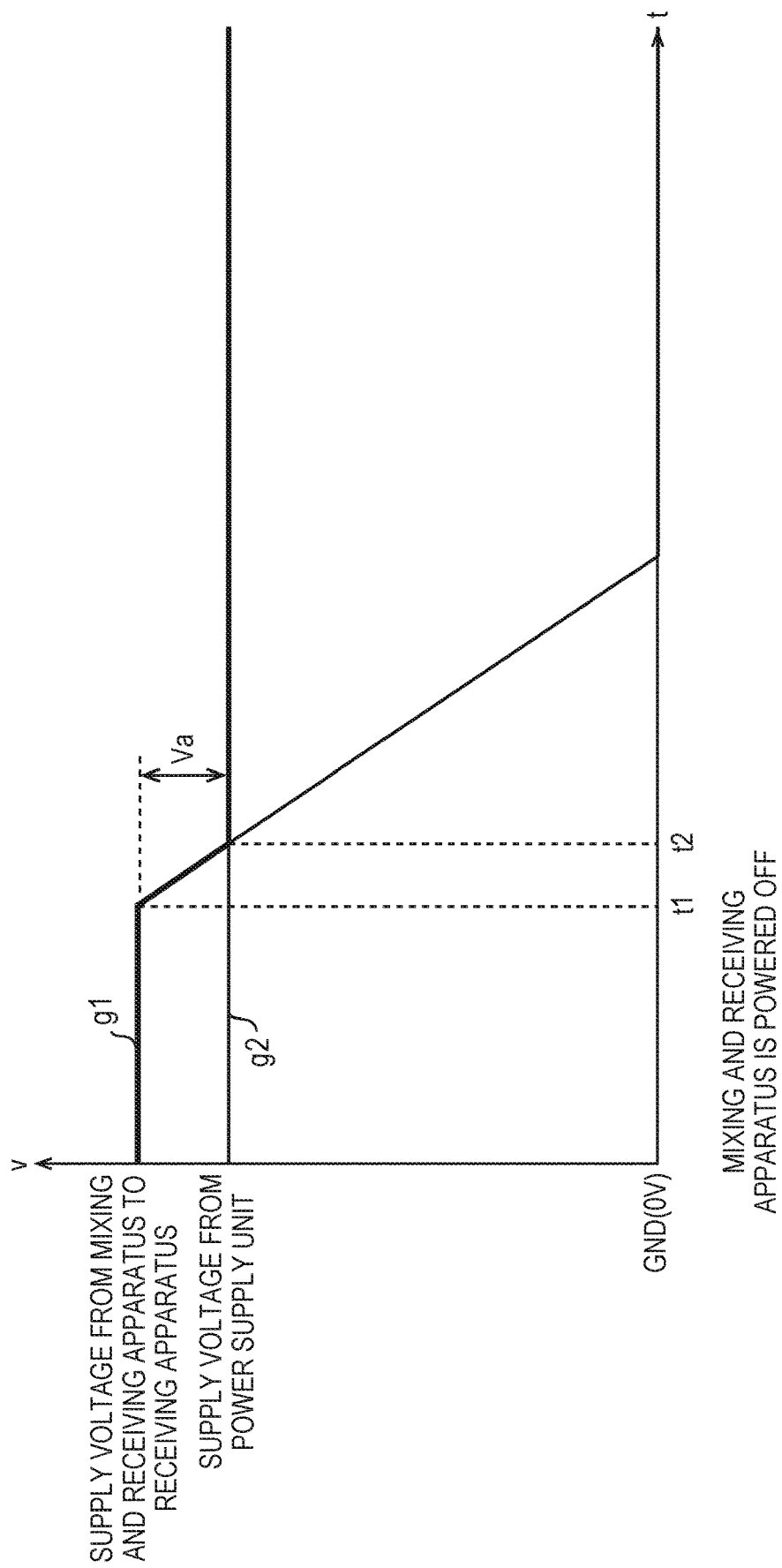
FIG. 19 is a timing chart illustrating a change in a supply voltage output from each of a main mixing and receiving apparatus and the power supply unit to the main reference receiving apparatus.

FIG. 19 is a timing chart illustrating a change in a supply voltage output from each of the main mixing and receiving apparatus 8A and the power supply unit 150 to the main reference receiving apparatus 3Aw1. The vertical axis illustrates a voltage v and the horizontal axis illustrates a time t. In a period when the main mixing and receiving apparatus 8A is powered on (a period before a time t1 in the drawing), the supply voltage of the main mixing and receiving apparatus 8A is higher than the supply voltage of the power supply unit 150 by a predetermined voltage difference Va or more. The diode 155 prevents a backflow of the current for the voltage difference Va. In this case, the supply voltage of the main mixing and receiving apparatus 8A is supplied to the main reference receiving apparatus 3Aw1.

In the main mixing and receiving apparatus 8A is powered off at the time t1, the supply voltage of the main mixing and receiving apparatus 8A gradually decreases. When the supply voltage of the main mixing and receiving apparatus 8A reaches a voltage smaller than the output voltage of the voltage generator 152 at a time t2, the diode 155 is turned on (is conducted). In this case, the output voltage of the voltage generator 152 is supplied to the main reference receiving apparatus 3Aw1. When the diode 155 is turned on, the voltage supplied to the main reference receiving apparatus 3Aw1 is switched from the supply voltage of the main mixing and receiving apparatus 8A to the output voltage of the voltage generator 152.

Here, the main mixing and receiving apparatus 8A is connected to a commercial AC power supply, but the main mixing and receiving apparatus 8A may operate by receiving a voltage supply from a power supply unit or an AC adapter.

As described above, the main wireless microphone system 5A1 according to Embodiment 2 includes the plurality of receiving apparatuses 3 (an example of a slave receiving apparatus, for example, the main reference receiving apparatus 3Aw1, and the main receiving apparatuses 2Aw2 and 3Aw3) capable of respectively and wirelessly communicating with one or more microphone slave devices 2, the main wireless microphone system (an example of a receiving apparatus segment) having the main mixing and receiving apparatus 8A (an example of a master receiving apparatus) connected with the plurality of receiving apparatuses 3, and the power supply unit 150 (an example of a power supply device), connected with the main reference receiving apparatus 3Aw1 among the plurality of receiving apparatuses 3 and the main mixing and receiving apparatus 8A, capable of supplying the power supply voltage. In a case where the main mixing and receiving apparatus 8A is powered off, the main reference receiving apparatus 3Aw1 repeatedly (for example, periodically) transmits the wireless control signal for controlling synchronization with the sub wireless microphone system 5B, including at least the plurality of receiving apparatuses 3 (for example, the sub reference receiving apparatus 3Bw1 and the sub receiving apparatuses 3Bw2 and 3Bw3) capable of wirelessly communicating with the respective one or more microphone slave devices 2, and the main wireless microphone system 5A1 based on the power supply voltage supplied from the power supply unit 150.

As a result, even in an environment where the coexistent area exists in the coverage areas of the plurality of wireless microphone systems, wireless synchronization between the respective wireless microphone systems is precisely realized and an output of a high-quality audio signal between the respective wireless microphone systems is supported. In addition, even in a case where the mixing and receiving apparatus is powered off, by alternately supplying the power supply voltage of the main reference receiving apparatus from the power supply unit, the main reference receiving apparatus can maintain the power-on state and avoid a loss of the wireless synchronization between the wireless microphone system, in which the own device is included, and the other wireless microphone system.

Further, in a case where it is determined that the main mixing and receiving apparatus 8A is powered on, the main reference receiving apparatus 3Aw1 repeatedly transmits the wireless control signal based on the power supply voltage supplied from the main mixing and receiving apparatus 8A. As a result, the power supply unit 150 can be used as a backup power supply when the main mixing and receiving apparatus 8A is powered off. Therefore, while the power supply of the main mixing and receiving apparatus 8A is restored, the power supply unit 150 may supply the power supply voltage and the main reference receiving apparatus may continue to transmit the wireless control signal, so that it is possible to use the power supply unit 150 having a small power supply capability. Accordingly, the power supply unit 150 can be added to the main wireless microphone system 5A at low cost.

Modification Example 1 of Embodiment 2

Figure 20:
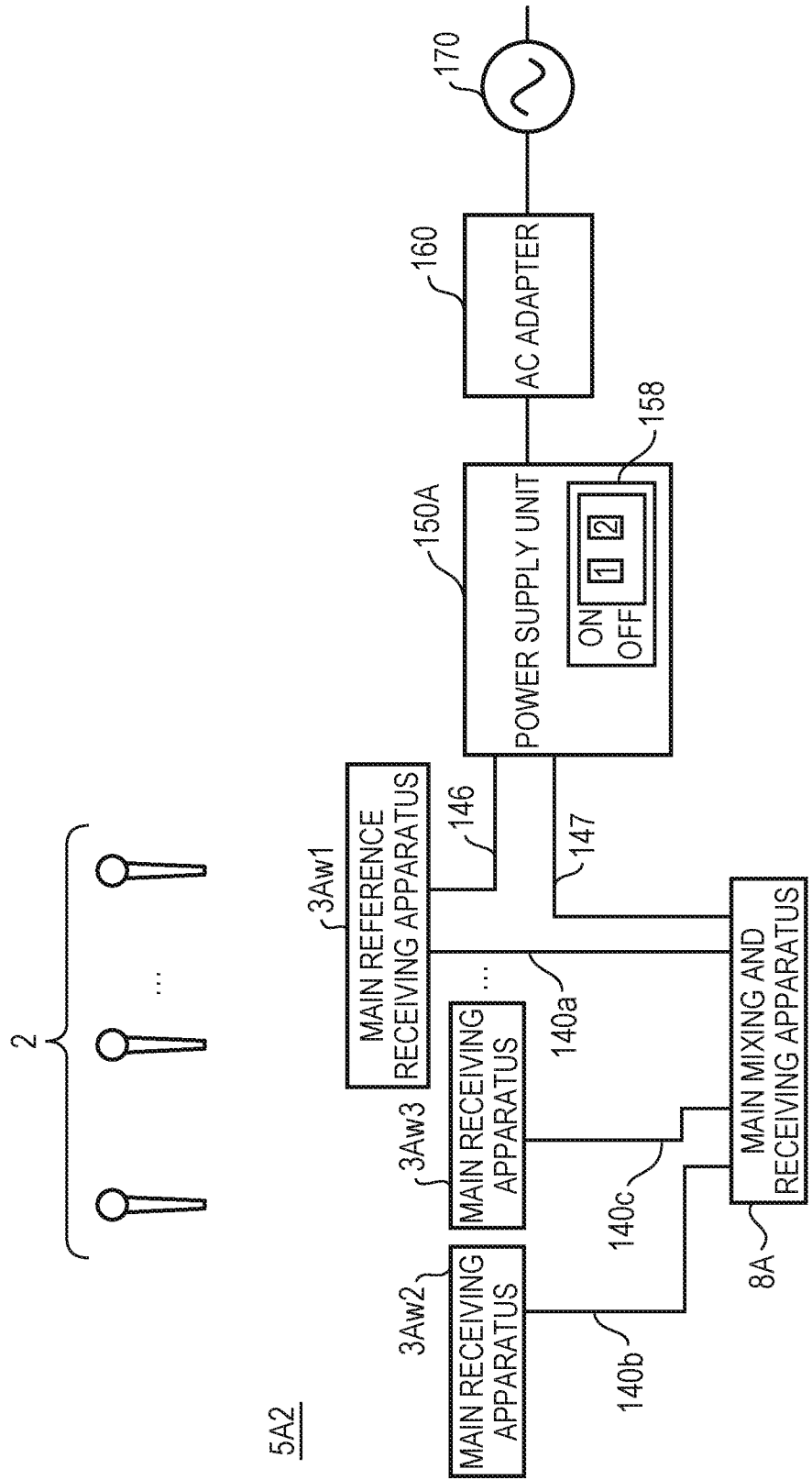
FIG. 20 is a diagram illustrating a configuration of a main wireless microphone system according to Modification Example 1 of Embodiment 2.

FIG. 20 is a diagram illustrating a configuration of a main wireless microphone system 5A2 according to Modification Example 1 of Embodiment 2. The main wireless microphone system 5A2 according to Modification Example 1 of Embodiment 2 includes a power supply unit 150A having a configuration different from the configuration of the power supply unit 150A according to Embodiment 2.

The power supply unit 150A varies a voltage value of the output voltage generated by the voltage generator 152 and supplies the output voltage different from the voltage value to the main reference receiving apparatus 3Aw1. In a case where the power supply voltage supplied from the power supply unit 150A to the main reference receiving apparatus 3Aw1 is 24 V, the radio controller 31 of the main reference receiving apparatus 3Aw1 sets a wireless output transmitted by the radio unit 21 to a high-output mode. In addition, in a case where the power supply voltage supplied from the power supply unit 150A to the main reference receiving apparatus 3Aw1 is 20 V, the radio controller 31 of the main reference receiving apparatus 3Aw1 sets the wireless output transmitted by the radio unit 21 to a middle-output mode. Further, in a case where the power supply voltage supplied from the power supply unit 150A to the main reference receiving apparatus 3Aw1 is 16 V, the radio controller 31 of the main reference receiving apparatus 3Aw1 sets the wireless output transmitted by the radio unit 21 to a low-output mode.

Figure 21:
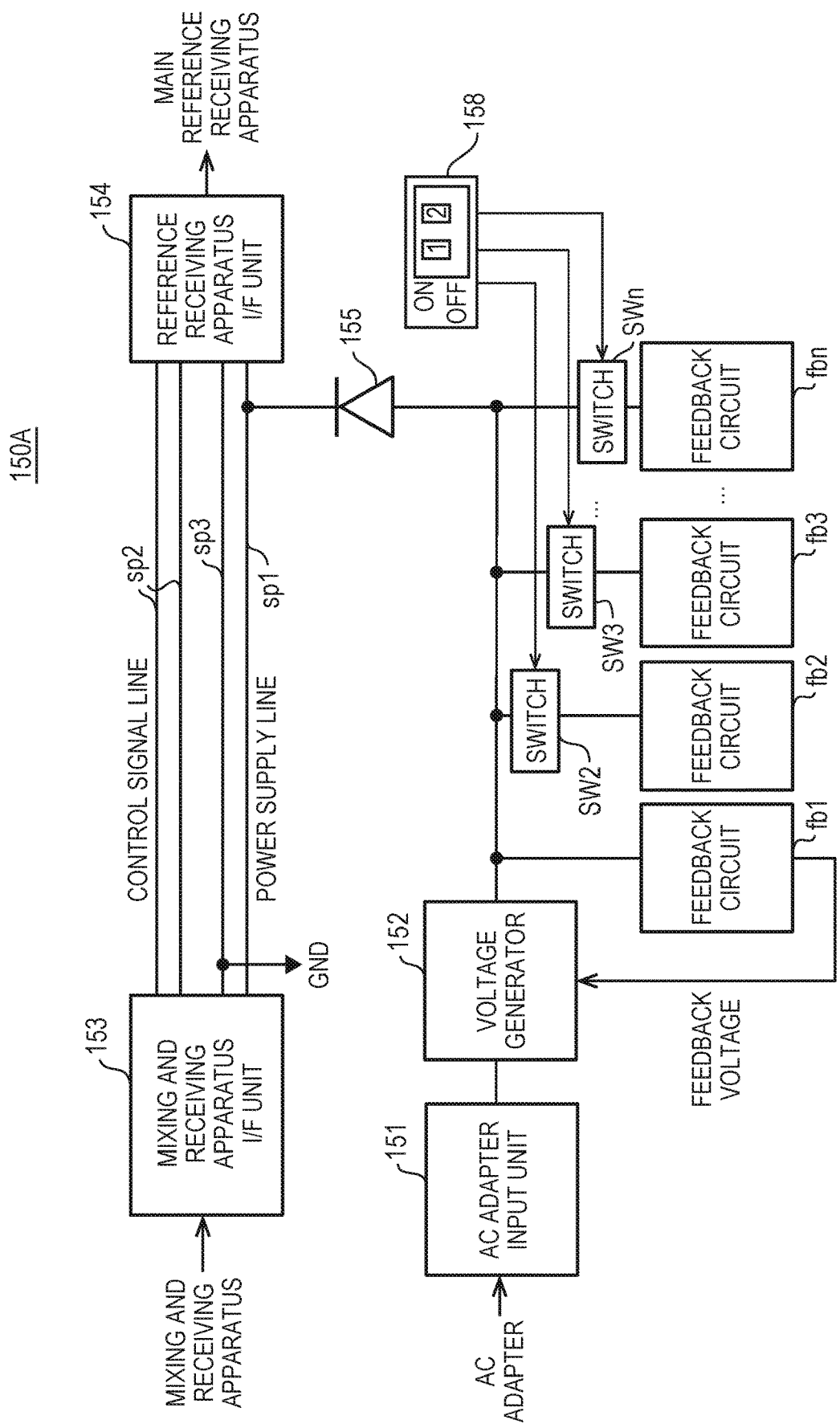
FIG. 21 is a diagram illustrating a configuration of the power supply unit.

FIG. 21 is a diagram illustrating a configuration of the power supply unit 150A. The power supply unit 150A is configured to include an output voltage setting unit 158, feedback circuits fb2, fb3, . . . , and fbn, and switches SW2, SW3, . . . , and SWn in addition to the configuration of the power supply unit 150 described above. A value of n is predetermined and here, a case where n is a value 4 is described.

For example, in a case where the switch SW2 is turned on, a feedback resistance of the voltage generator 152 becomes a combined resistance of the feedback circuit fb1 and the feedback circuit fb2. In this case, the voltage generator 152 supplies the power supply voltage of 24 V. In addition, in a case where the switch SW3 is turned on, the feedback resistance of the voltage generator 152 becomes a combined resistance of the feedback circuit fb1 and the feedback circuit fb3. In this case, the voltage generator 152 supplies the power supply voltage of 20 V. In addition, in a case where the switch SWn (n=4) is turned on, the feedback resistance of the voltage generator 152 becomes a combined resistance of the feedback circuit fb1 and the feedback circuit fbn (n=4). In this case, the voltage generator 152 supplies the power supply voltage of 16 V.

Figure 22:
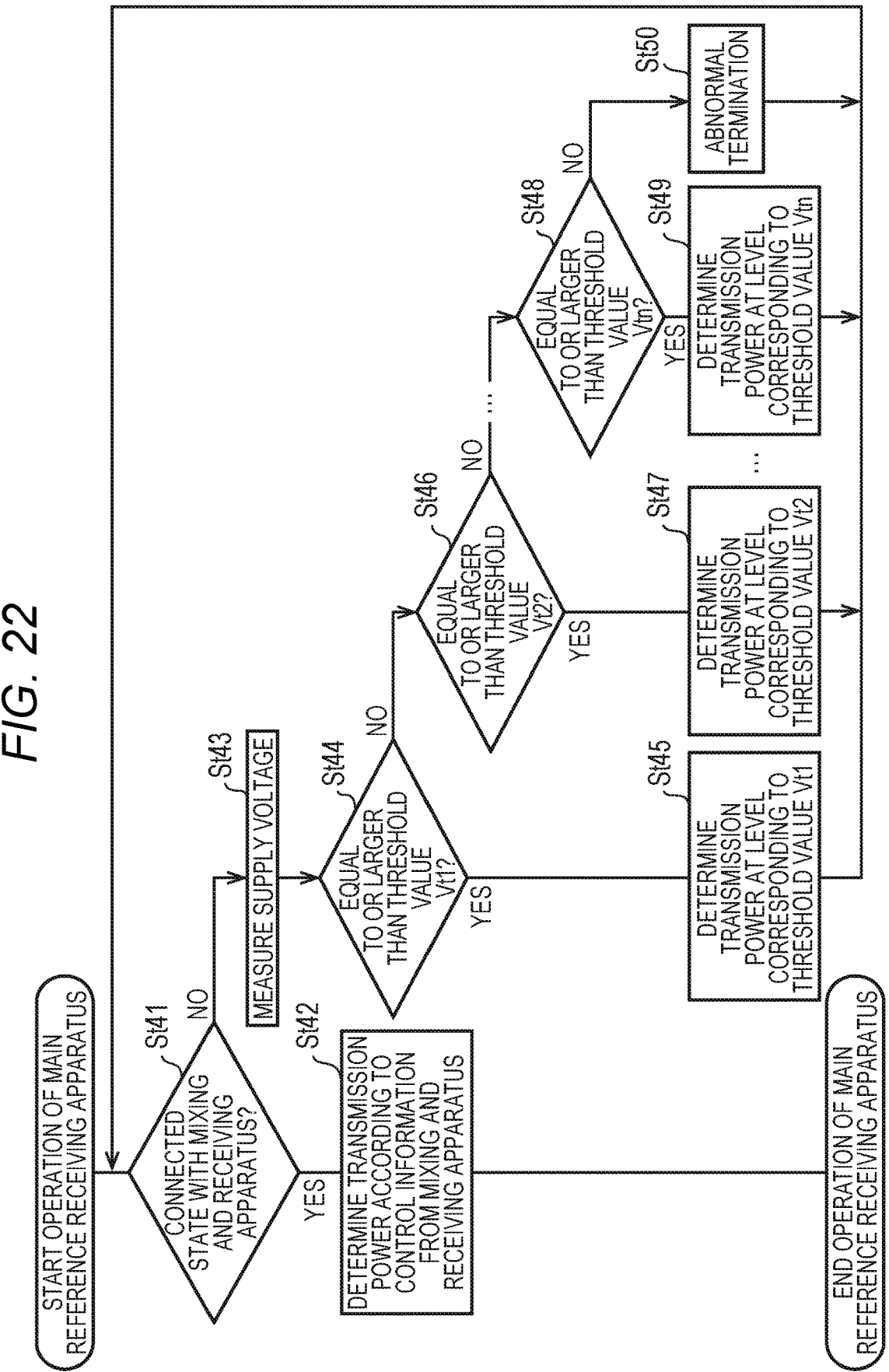
FIG. 22 is a flowchart illustrating an operation procedure of the main reference receiving apparatus.

FIG. 22 is a flowchart illustrating an operation procedure of the main reference receiving apparatus 3Aw1. The controller 20 of the main reference receiving apparatus 3Aw1 determines whether or not the main reference receiving apparatus 3Aw1 is in a connected state with the main mixing and receiving apparatus 8A (that is, whether or not the main mixer-receiver apparatus 8A is in a power-on state) (St41). In a case where the main mixing and receiving apparatus 8A is powered on, the controller 20 determines transmission power (transmission signal level) of the wireless control signal according to the control information from the main mixing and receiving apparatus 8A (St42). After then, the controller 20 terminates the processes in FIG. 22.

In a case where the main mixing and receiving apparatus 8A is powered off in step St41, the controller 20 measures the supply voltage of the power supply unit 150A (St43). The controller 20 determines whether or not the measured supply voltage is equal to or larger than a threshold value Vt1 (St44). The threshold value Vt1 is a voltage set between voltages 24 V and 20 V.

In a case where the measured supply voltage is equal to or larger than the threshold value Vt1, since the power supply voltage is 24 V, the controller 20 determines the transmission power in the high-output mode corresponding to the threshold value Vt1 (St45). After then, the process of the controller 20 returns to step St41. In a case where the measured supply voltage is smaller than the threshold value Vt1 in step St44, the controller 20 determines whether or not the measured supply voltage is equal to or larger than a threshold value Vt2 (St46). The threshold value Vt2 is a voltage set between voltages 20 V and 16 V. In a case where the measured supply voltage is equal to or larger than the threshold value Vt2, since the power supply voltage is 20 V, the controller 20 determines the transmission power in the middle-output mode corresponding to the threshold value Vt2 (St47). After then, the process of the controller 20 returns to step St41.

In addition, in a case where the measured supply voltage is smaller than the threshold value Vt2 in step St46, the controller 20 determines whether or not the measured supply voltage is equal to or larger than a threshold value Vtn (n=3) (St48). The threshold value Vtn is a voltage set between voltages 16 V and 10 V. In a case where the measured supply voltage is equal to or larger than the threshold value Vtn, since the power supply voltage is 16 V, the controller 20 determines the transmission power in the low-output mode corresponding to the threshold value Vtn (St49). After then, the process of the controller 20 returns to step St41. In a case where the measured supply voltage is smaller than the threshold value Vtn in step St48, the controller 20 determines that the supply voltage of the power supply unit 150 is abnormal and stops the transmission of the wireless control signal (St50). The abnormality of the supply voltage is, for example, malfunction of the power supply unit 150A, disconnection of the power line 146, or the like. After then, the process of the controller 20 returns to step St41.

As described above, in the main wireless microphone system 5A2 according to Modification Example 1 of Embodiment 2, the main reference receiving apparatus 3Aw1 monitors the supply voltage to the own device and determines the signal output level of the wireless control signal according to the value of the supply voltage. As a result, the main reference receiving apparatus can continue the wireless control signal at the signal output level matching the power supply capacity of the power supply unit. Therefore, it is possible to adopt various the power supply units. Further, the power supply unit can vary the supply voltage according to the signal output level of the main reference receiving apparatus and it is not necessary to supply a voltage higher than necessary to the main reference receiving apparatus. Therefore, the power supply unit can be a general-purpose power supply unit capable of corresponding to many main reference receiving apparatuses.

Although the various embodiments are described with reference to the accompanying drawings, the present disclosure is not limited to such an example. Those skilled in the art can conceive various modification examples, change examples, substitution examples, addition examples, deletion examples, and equivalent examples within the scope described in the claims and these rightly belong to the technical scope of the present disclosure. Further, without departing from the gist of the invention, the respective components in the various embodiments described above may be arbitrarily combined.

For example, in the embodiments described above, during one frame period of the wireless communication of the DECT method, in the first half slots S0 to S11 (for downlink), the radio processing unit and the microphone slave device for each of the carriers and each of the slots are associated with the communication channel and the control channel. In the same manner, in the latter half slots S12 to S23 (for uplink), the radio processing unit and the microphone slave device for each of the carriers and each of the slots may be associated with the communication channel.

In addition, in the embodiments described above, the DECT of a frequency bandwidth of 1.9 GHz is used as the communication method, but the frequency bandwidth and the communication standard are not limited thereto, and a communication method such as a wireless LAN of a frequency bandwidth of 2.4 GHz or the like may be used.

The present disclosure is useful as a receiving apparatus, and a wireless synchronization method capable of precisely realizing wireless synchronization between the respective wireless microphone systems and supporting an output of a high-quality audio signal between the respective wireless microphone systems even in an environment where a coexistent area exists in the coverage areas of the plurality of wireless microphone systems.

The present application is based upon Japanese Patent Application (Patent Application No. 2018-032444) filed on Feb. 26, 2018, the contents of which are incorporated herein by reference.

What is claimed is:

1. A wireless microphone system comprising:
   a first receiving apparatus segment that includes a plurality of first slave receiving apparatuses capable of respectively performing wireless communication with one or more microphones and a first master receiving apparatus connected with the plurality of first slave receiving apparatuses; and
   at least one second receiving apparatus segment that includes a plurality of second slave receiving apparatuses capable of respectively performing wireless communication with one or more microphones and a second master receiving apparatus connected with the plurality of second slave receiving apparatuses,
   wherein one of the plurality of first slave receiving apparatuses which serves as a reference first slave receiving apparatus repeatedly transmits a wireless control signal for controlling synchronization between the first receiving apparatus segment and the second receiving apparatus segment;
   wherein one of the plurality of second slave receiving apparatuses which serves as a reference second slave receiving apparatus transmits a reference timing signal for performing synchronization in the second receiving apparatus segment including the reference second slave receiving apparatus to the second master receiving apparatus in synchronization with the wireless control signal;
   wherein the second master receiving apparatus transmits a synchronization timing signal for performing synchronization in the second receiving apparatus segment including the second master receiving apparatus to another one of the plurality of the second slave receiving apparatuses in the second receiving apparatus segment including the second master receiving apparatus in response to the reference timing signal,
   wherein the reference first slave receiving apparatus transmits a reference timing signal to the first master receiving apparatus; and
   wherein the first master receiving apparatus transmits a synchronization timing signal for performing synchronization in the first receiving apparatus segment to another one of the plurality of first slave receiving apparatuses in the first receiving apparatus segment in response to the reference timing signal transmitted from the reference first slave receiving apparatus.

2. The wireless microphone system according to claim 1, wherein the another one of the plurality of first slave receiving apparatuses and the another one of the plurality of second slave receiving apparatuses are synchronized based on the synchronization timing signal and adjust a start position of a frame used for wireless communication with the microphone.

3. The wireless microphone system according to claim 1, wherein the first master receiving apparatus:
    includes a plurality of terminals to which a signal line of each of the plurality of first slave receiving apparatuses is connected, and
    sets one of the plurality of first slave receiving apparatuses which is connected via the signal line to a predetermined terminal among the plurality of terminals of the first master receiving apparatus as the reference first slave receiving apparatus.

4. The wireless microphone system according to claim 1, wherein the first master receiving apparatus:
    includes a setting unit capable of receiving a user input; and
    sets the reference first slave receiving apparatus among the plurality of first slave receiving apparatuses based on setting information received by the setting unit.

5. The wireless microphone system according to claim 1, wherein the first master receiving apparatus:
    includes a connection unit capable of connecting with an external device; and
    sets the reference first slave receiving apparatus among the plurality of first slave receiving apparatuses based on setting information transmitted from the external device.

6. A wireless microphone system comprising:
    a first receiving apparatus segment that includes a plurality of first slave receiving apparatuses capable of respectively performing wireless communication with one or more microphones and a first master receiving apparatus connected with the plurality of first slave receiving apparatuses; and
    at least one second receiving apparatus segment that includes a plurality of second slave receiving apparatuses capable of respectively performing wireless communication with one or more microphones and a second master receiving apparatus connected with the plurality of second slave receiving apparatuses,
    wherein one of the plurality of first slave receiving apparatuses which serves as a reference first slave receiving apparatus repeatedly transmits a wireless control signal for controlling synchronization between the first receiving apparatus segment and the second receiving apparatus segment;
    wherein one of the plurality of second slave receiving apparatuses which serves as a reference second slave receiving apparatus transmits a reference timing signal for performing synchronization in the second receiving apparatus segment including the reference second slave receiving apparatus to the second master receiving apparatus in synchronization with the wireless control signal;
    wherein the second master receiving apparatus transmits a synchronization timing signal for performing synchronization in the second receiving apparatus segment including the second master receiving apparatus to another one of the plurality of the second slave receiving apparatuses in the second receiving apparatus segment including the second master receiving apparatus in response to the reference timing signal, and
    wherein the first master receiving apparatus:
        stores transmission delay time information of signals with the plurality of first slave receiving apparatuses respectively connected to the first master receiving apparatus, for each of the plurality of first slave receiving apparatuses; and
        transmits the synchronization timing signal based on the transmission delay time information for each of the plurality of first slave receiving apparatuses.

7. A wireless synchronization method implemented by a wireless microphone system, the system including
    a first receiving apparatus segment that includes a plurality of first slave receiving apparatuses capable of respectively performing wireless communication with one or more microphones and a first master receiving apparatus connected with the plurality of first slave receiving apparatuses, and
    at least one second receiving apparatus segment that includes a plurality of second slave receiving apparatuses capable of respectively performing wireless communication with one or more microphones and a second master receiving apparatus connected with the plurality of second slave receiving apparatuses, the method comprising:
    repeatedly transmitting, from one of the plurality of first slave receiving apparatuses which serves as a reference first slave receiving apparatus, a wireless control signal for controlling synchronization between the first receiving apparatus segment and the second receiving apparatus segment,
    transmitting, from one of the plurality of second slave receiving apparatuses which serves as a reference second slave receiving apparatus, a reference timing signal for performing synchronization in the second receiving apparatus segment including the reference second slave receiving apparatus to the second master receiving apparatus in synchronization with the wireless control signal; and
    transmitting, from the second master receiving apparatus, a synchronization timing signal for performing synchronization in the second receiving apparatus segment including the second master receiving apparatus to another one of the plurality of second slave receiving apparatuses in the second receiving apparatus segment including the second master receiving apparatus, in response to the reference timing signal,
    wherein the reference first slave receiving apparatus transmits a reference timing signal to the first master receiving apparatus; and
    wherein the first master receiving apparatus transmits a synchronization timing signal for performing synchronization in the first receiving apparatus segment to another one of the plurality of first slave receiving apparatuses in the first receiving apparatus segment in response to the reference timing signal transmitted from the reference first slave receiving apparatus.

* * * * *